US006658217B2

(12) United States Patent
Ohhata et al.

(10) Patent No.: US 6,658,217 B2
(45) Date of Patent: *Dec. 2, 2003

(54) OPTICAL RECEIVER

(75) Inventors: Kenichi Ohhata, Hachioji (JP); Ryoji Takeyari, Koganei (JP); Toru Masuda, Kokubunji (JP); Katsuyoshi Washio, Tokorozawa (JP); Yasushi Hatta, Kodaira (JP)

(73) Assignees: Hitachi, Ltd., Tokyo (JP); Hitachi Device Engineering Co., Ltd., Chiba (JP)

( * ) Notice: Subject to any disclaimer, the term of this patent is extended or adjusted under 35 U.S.C. 154(b) by 134 days.

This patent is subject to a terminal disclaimer.

(21) Appl. No.: 09/946,450

(22) Filed: Sep. 6, 2001

(65) Prior Publication Data

US 2002/0005974 A1 Jan. 17, 2002

Related U.S. Application Data

(63) Continuation of application No. 09/041,973, filed on Mar. 13, 1998, now Pat. No. 6,304,357.

(30) Foreign Application Priority Data

Mar. 13, 1997 (JP) .............................. 9-58790

(51) Int. Cl.[7] .............................................. H04B 10/06
(52) U.S. Cl. ...................... 398/202; 398/210; 398/140; 250/214 A; 330/308; 379/56.2
(58) Field of Search ................................ 359/189, 194, 359/127, 114, 173; 250/201.1, 219 A, 214 AG; 330/308, 59; 379/56.2; 398/202, 210, 82, 140, 141

(56) References Cited

U.S. PATENT DOCUMENTS 4,665,560 A    5/1987   Lange .......................... 455/249
4,731,880 A  * 3/1988   Ault et al. .................. 359/120
5,636,048 A    6/1997   Kogure et al. ............... 359/194

(List continued on next page.)

FOREIGN PATENT DOCUMENTS

| JP | 5-67930 | 3/1993 |
|----|---------|--------|
| JP | 5-218758 | 8/1993 |
| JP | 5-259752 | 10/1993 |

(List continued on next page.)

OTHER PUBLICATIONS

M. Moller et al, "13 Gb/s si–Bipolar AGC Amplier IC with High Gain and Wide Dynamic Range for Optical–Fiber Receivers", IEEE Journal of Solid–State Circuits, vol. 29, No. 7, Jul. 1994, p. 815–821.

(List continued on next page.)

*Primary Examiner*—Kinfe-Michael Negash
(74) *Attorney, Agent, or Firm*—Mattingly, Stanger & Malur, P.C.

(57) ABSTRACT

An optical receiver generates a voltage signal having a predetermined swing from a current signal, and feeds the voltage signal to a decision circuit. An optical receiving element receives the input optical signal, converts the optical signal to a current signal, and provides the current signal to a preamplifier, which converts the input current signal into a voltage signal. The voltage signal is input to an amplifier having a limiting function, which linearly amplifies the voltage signal when the swing of the voltage signal is smaller than a predetermined value, and limitedly amplifies the voltage signal when the voltage signal is greater than the predetermined value. An automatic-gain-control amplifier receives the output from the amplifier with the limiting function, and amplifies the input voltage signal to a voltage signal having a constant swing. The decision circuit receives the output of the automatic-gain-control amplifier and decides the binary nature of the voltage, and thus of the input optical signal.

12 Claims, 19 Drawing Sheets

U.S. PATENT DOCUMENTS

| | | | |
|---|---|---|---|
| 5,859,718 A | 1/1999 | Yamamoto et al. | 359/128 |
| 5,917,639 A | 6/1999 | Ushirozawa | 359/194 |
| 6,018,554 A | 1/2000 | Glover | 375/345 |
| 6,031,219 A | 2/2000 | Shuke | 250/214 R |
| 6,191,879 B1 | 2/2001 | Yanagisawa | 359/194 |

FOREIGN PATENT DOCUMENTS

| | | |
|---|---|---|
| JP | 7-38342 | 2/1995 |
| JP | 7-193437 | 7/1995 |
| JP | 8-139526 | 5/1996 |
| JP | 9-246879 | 9/1997 |

OTHER PUBLICATIONS

M. Nakamura et al, "An Instantaneous Response CMOS Optical Receiver IC with Wide DynamIc Range and Extremely High Sensitivity Using Feed–Forward Auto–Bias Adjustment", IEEE Journal of Solid–State Circuits, vol. 30, No. 9, Sep. 1995, p. 991–997.

Auto–Bias Adjustment, IEEE Journal of Solid–State Circuits, vol. 30, No. 9, Sep. 1995, p. 991–997.

* cited by examiner

OPTICAL RECEIVER

This is a continuation application of U.S. Ser. No. 09/041,973, filed Mar. 13, 1998 now U.S. Pat. No. 6,304,357.

BACKGROUND OF THE INVENTION

1. Field of the Invention

The present invention relates generally to optical receivers, and more particularly, to an optical receiver that adjusts the output swing in response to a change in the signal input, with high sensitivity and over a wide dynamic range.

2. Description of the Related Art

FIG. 1 shows a conventional optical receiver used in an optical transmission system for a main line having a maximum transmission distance of 100 km, for example. A receiving element (for example, an avalanche photodiode APD) receives an input optical signal, and outputs an optical ON/OFF rectangular pattern (corresponding to the binary signals "1" and "0", respectkvely) for every time period Δt, at a data rate of 1 bit. FIGS. 2(a)–2(c) illustrate a decision operation of the optical receiver for 6 bits of the input optical signal.

In the APD, an electron-hole pair induces avalanche multiplication, as caused by the optical signal, to amplify the signal current (FIG. 2(a)). This amplification makes it possible to detect even a weak optical signal. The current signal output from the APD is converted to a voltage signal VPRE by a preamplifier PRE (FIG. 2(b)). This signal VPRE is further amplified by an automatic-gain-control amplifier AGC (also known as a "gain-controllable amplifier"), and the resulting signal VAGC is input to a decision circuit DEC (FIG. 2(c)).

Even if the intensity of the input optical signal is weak (for example, as illustrated by the broken curve in FIG. 2(a)), the swing of the output signal VAGC of the AGC amplifier is held at a substantially constant level by the automatic gain control function of the AGC amplifier. As a result, the decision made by the decision circuit is stabilized.

In the decision circuit DEC, the datq are output in synchronism with a clock signal CLK by deciding that the output signal VAGC of the AGC amplifier is high ("1") if the output signal VAGC is higher than a reference voltage VTH (also called VTH(DEC) below), or low ("0") if lower than the reference voltage VTH. The clock signal CLK may be prepared from the output signal VAGC by a clock-extraction circuit CEXT.

An example of such an AGC amplifier is disclosed on pp. 815–822 of *IEEE Journal0of Solid-State Circuits*, Vol. 29, No. 7 (1994), and illustrated in the present FIG. 3. A voltage signal $V_{PRE}$ from the preamplifier PRE is amplified by three stages of amplifiers, including gain-controllable amplifiers A1 and A2, and a constant-gain amplifier A3. Then, the output of the constant-gain amplifier A3, which has a swing $V_{A3}$, is input to a peak detector PD. This peak detector PD generates a DC voltage V3 based upon the swing $V_{A3}$ using a capacitor $C_{PD}$.

A reference circuit REF generates the nominal value of the peak voltage VN (the "nominal voltage swing"). This nominal value VN is adjusted by a variable voltage source P connected to the reference circuit REF.

In the gain control circuit GC, the voltage V3 and the nominal value VN are compared so that voltages $V_{GC1}$ and $V_{GC2}$ for controlling the gains of the amplifiers A1 and A2 are set according to the difference (i.e., the deviation of the signal swing from the nominal voltage swing). Thus, the output swing of $V_{AGC}$ from the swing change of the input signal VPRE is suppressed to the end of obtaining a uniform swing according to the difference in circuit construction between amplifiers A1 and A2.

According to the AGC amplifier of FIG. 3, a voltage signal VAGC having a swing of 500 mV is output at a rate of 13 Gb/sec for an input signal having a swing of either 10 mV or 300 mV. These output signals are output from two output buffers OB so as to be input to the decision circuit DEC and the clock-extraction circuit respectively.

The AGC amplifier of FIG. 3 is further equipped with an offset-control circuit OC (having external capacitors $C_{OC}$) for controlling the offsets of the amplifiers A1, A2, and A3.

In response to the output signal from the AGC amplifier, the decision circuit DEC decides whether the signal $V_{AGC}$ is "1" or "0", by employing a voltage between the upper and lower ends of the swing voltage of the output signal as the reference voltage VTH(DEC).

FIG. 4 illustrates how the optical signal, as transmitted from the optical transmission passage (optical fibers, for example), is converted to a voltage signal by the preamplifier PRE. The abscissa indicates the signal voltage value, and the ordinate indicates the frequency with which the signal is generated at a predetermined voltage level. When the signals are transferred in response to the ON/OFF of the optical signal, the distribution is made, as illustrated by the solid curve in FIG. 4, with noise produced in the photoelectric converting element and in the preamplifier PRE. At this time, the reference voltage set by the decision circuit DEC is set to an intermediate value $V_{th}(A)$ between the average voltage value V1 of a high signal ("1") and average value V0 of a low signal ("0").

The "1" signal, however, may have a wider voltage distribution than that of the "0" signal. Specifically, the voltage distribution of a "1", signal takes the shape (illustrated by a broken curve in FIG. 4) in which the solid curve of FIG. 4 is depressed in the ordinate direction. This shape is especially prominent when either an APD or an erbium-doped fiber amplifier (EDFA) in combination with a PIN junction photodetector (or PIN diode) is used as the optical receiving element. See "Optical Fiber Communication Technique", published by NIKKAN KOGYO SHINBUN SHA. Voltages signals that do not exceed the reference voltage $V_{th}(A)$ are decided to be "0" signals even if they are "1" signals in fact, due to this error. The probability for these erroneous decisions is the "error rate" of the decision circuit. For the reference voltage $V_{th}(A)$, the error rate is defined as the ratio of the area of the region under the broken-line curve to the left of $V_{th}(A)$, to the entire area under the broken-line curve, which represents the voltage distribution of the actual "1" signal.

The error rate cannot be zero when the voltage distribution curve (broken curve) of the "1", signals and the voltage distribution curve (solid curve) of the "0" signals overlap. However, the error rate can be reduced when the threshold voltage is considerably shifted toward $V_0$. For example, a threshold voltage $V_{th}(B)$ can be set at a point where the voltage distribution curve of the "1" signal and the voltage distribution curve of the "0" signal intersect. Hence, although not eliminated, the error rate can be reduced as low as the area ratio shown hatched in FIG. 4.

Although some actual "0" signals (having an intensity over Vth(B)) are detected as "1" signals in the decision circuit due to an error component under Vth(B), the total error rate is reduced compared with that under Vth(A).

Moreover, the distribution of the signal voltage extends wider than the magnitude (V1–V0) of the signal anyway, so that the error rate cannot be completely reduced to 0 irrespective of where the reference voltage is set. In the optical receiver, therefore, the reference voltage is set within a range that allows and achieves a remarkably low constant error rate (e.g., $10^{-12}$). Then, the transmission errors that do occur can be detected and corrected with an error correction code.

FIG. 5 schematically illustrates the relationship between the set range of the reference voltage and the optical signal intensity, with an error rate considered with an APD or the combination of an EDFA and PIN diode as the optical receiving element. The "1", signal indicates a wider voltage distribution than that of the "0" signal, as described above, so that the set range of the reference voltage is offset toward the "0" signal peak. When the optical signal intensity becomes lower, the set range of the reference voltage grows gradually narrower until the desired error rate cannot be achieved at all. The optical signal intensity at this point (indicated by Pmin0) is called the "minimum receiver sensitivity". Pmin0 represents the point below which the overlap of the "1" and "0" curves (which represents the error rate) is too great for the desired error rate to be achieved.

To cover applications for various transmission distances, a wide input dynamic range is required, even for a receiver for a main line. When the transmission distance is short, the optical signal attenuation through the optical fibers is so low that an intense optical signal is input to the receiver. When the transmission distance is long, on the other hand, the input optical signal is very weak. Thus, the optical receiver must be capable of handling both cases.

When a strong optical signal is input to a receiver having the construction shown in FIG. 1, the following problem, discussed with additional reference to FIGS. 6(a)–6(c), is caused by the slew rate of the preamplifier. FIGS. 6(a)–6(c) illustrate response waveforms for the receiver when a strong optical signal is input. When the intensity of the optical signal is high, the output current of the optical receiving element rises, to increasing the output swing of the preamplifier. When the output swing of the preamplifier becomes excessively large, however, a signal change occurs before the output signal reaches a steady value, as illustrated, so that the output waveform partially takes a triangular shape. The partial triangular shape results because the changing rate of the output VPRE of the preamplifier has an upper limit (dV/dt) called the "slew rate". If the slew rate of the AGC amplifier is sufficiently higher than that of the preamplifier, the output signal of the AGC amplifier has a similar waveform as that of the VPRE.

In the illustrated example, the first bit (left side) or the fifth bit (second bit from right side) are erroneously decided no matter where the reference voltage VTH(DEC) might be set, because the preferable VTH(DEC) for deciding the first bit as "0" cannot but be too high for the fifth bit to be decided as "1", and the preferable VTH(DEC) for deciding the fifth bit as "1" cannot but be too low for the first bit to be decided as "0", Vth(A). Since the output VPRE of the preamplifier has a large swing, moreover, the voltage to be applied to a transistor of the output stage of the preamplifier rises so high as to make it necesasary to use a transistor with a high breakdown voltage. Since the action rate of a transistor having a high breakdown voltage is generally lower than that of one having a low breakdown voltage, however, another problem arises in that the transistor cannot be used in a high-speed optical receiver. Thus, a highly intense optical signal is not easily handled by the construction shown in FIG. 1.

An optical receiver that is capable of avoiding these problems caused by the slew rate is disclosed on pp. 991–997 of *IEEE Journal of Solid-State Circuits,* Vol. 30, No. 9 (1995). FIG. 7 illustrates a construction of an optical receiver disclosed in this article. This circuit is employed in a local area network (LAN), for example, and has a transmission distance as short as several Km at most. Therefore, the APD is replaced by a PIN photodiode. The AGC amplifier is also replaced, by a limiting amplifier LA.

Although the output signal swing is held constant in the AGC amplifier by controlling the gain, the gain of the limiting amplifier LA is set at a remarkably high value so that the output signal is clamped to a predetermined voltage range, to limit the swing whenever the output swing rises above a desired value. Specifically, the reference voltage VTH(LA) is controlled by the reference voltage control circuit VCNT to be just intermediate between the high voltage (corresponding to "1", for example) and the low voltage (corresponding to "0", for example) of the input signal. The input signal and VTH(LA) are compared so that a constant voltage VLA(1) is output irrespective of the swing of the input signal if the input signal is higher than VTH(LA), but a constant voltage VLA(0) is output irrespective of the input signal swing if the input signal is lower than VTH(LA).

In this example, the gain of the limiting amplifier LA is set at about 60 dB so that an output signal of constant swing is achieved over a wide range of input signals, from several mV to about 1 V. With this construction, the gain of the limiting amplifier is so high that the gain (i.e., the ratio between the output voltage and the input current, also called the "transimpedance") of the preamplifier need not be raised so high. Even when an optical signal of high intensity is input, therefore, the swing of the output VPRE of the preamplifier is not so large as that of the aforementioned construction, so that the signal is neither distorted nor becomes a triangular wave, as illustrated in FIG. 6(b). This raises no problem due to the slew rate.

In this, however, if an APD or the combination of an EDFA and PIN diode are used as the optical receiving element instead of the PIN photodiode alone, the minimum receiver sensitivity is deteriorated. FIG. 8 illustrates a set range of the reference voltage VTH(LA) of the limiting amplifier LA in the preamplifier output VPRE. Because an optical receiving element having an amplifying function is used, the "1" signal indicates a wider voltage distribution than that of the "0" signal, and the set range of the reference voltage is offset towards the "0" signal side, as before. The output (VLA) of the limiting amplifier LA is derived by extracting a signal represented by VTH(LA)±several mV from the VPRE and by amplifying it (a voltage width of several mV being indicated by a double curve). The VTH (LA) is set just intermediate between the VPRE(0) and the VPRE(1), such that the VTH(LA) deviates from the set range of the reference value for a region where the optical signal intensity is Pmin1 or less. As a result, the minimum receiver sensitivity is at Pmin1, which is a lower sensitivity (i.e., Pmin1 is>than Pmin0) than that of the construction of FIG. 1.

The deterioration of the minimum receiver sensitivity does not take place in the construction of this circuit, however, because the PIN diode is used as the optical receiving element. Since the PIN diode has no amplifying action, the "1" signal exhibits the same voltage distribution as that of the "0" signal, so that the aforementioned problem does not occur even if the VTH(LA) is set just intermediate between the VPRE(0) and the VPRE(1).

Thus, to avoid the problem, the reference voltage VTH (LA) of the limiting amplifier LA can be adjusted, not to the center of the VPRE, but towards the side of the "0" level. However, this method is extremely difficult to realize, because the intensity of the optical signal to be adjusted is weak (especially within a range less than Pmin1), and because the reference voltage VTH(LA) must be precisely adjusted under the condition of a small swing of the VPRE. Since the intensity of the optical signal fluctuates by the degradation in the characteristics of the transmitter or the optical fibers, it is necessary to periodically readjust the reference voltage VTH(LA). Thus, it has been impossible to use a wide dynamic range receiver in a LAN, as disclosed in this article, as has been used for long distance transmission.

Other techniques for widening the dynamic range of the optical receiver are disclosed in Japanese Patent Laid Open No. 93-259752 (Tokukai-Hei 05-259752), which discloses an improved technique for setting a reference potential of the discrimination (decision) circuit, according to which the circuit decides a voltage signal input thereto to be either "0" or "1", and in Japanese Patent Laid Open No. 96-139526 (Tokukai-Hei 08-139526), No. 95-193437 (Tokukai-Hei 07-193437), No. 95-38342 (Tokukai-Hei 07-38342), and No. 93-67930 (Tokukai-Hei 05-67930), which disclose improved circuitries for setting the gain of the preamplifier. All of these techniques are aimed to be applied for optical communication systems having a transmission rate of 100 MHz. Therefore, these techniques are expected to have sufficient responses to receive optical pulses at intervals of 10 ns, but cannot be expected to respond to optical pulses at intervals of 100 ps, as is the case for optical communication systems for trunk lines having a transmission rate of 10 GHz.

Japanese Patent Laid Open No. 97-246879 (Tokukai-Hei 09-246879), and No. 93-218758 (Tokukai-Hei 05-218758) disclose techniques for suppressing deterioration of the width of the voltage pulse in the optical receiver, but the key techniques for solving the problems illustrated in FIGS. 1 and 7, discussed above, are not disclosed.

SUMMARY OF THE INVENTION

An object of the present invention is to provide an optical receiver having a high sensitivity and a wide dynamic range.

To achieve this and other objects, the invention provides an optical receiver for converting an optical signal into an electrical signal, including an optical receiving element (photoelectric converter) for converting the optical signal into a current signal, a preamplifier for converting the current signal output by the photoelectric converter into a voltage signal, an amplifier having a limiting function for linearly amplifying the voltage signal when the difference between the voltage signal and a reference voltage is smaller than a predetermined voltage, and for limitedly amplifying the voltage signal when the difference is larger than the predetermined voltage, and an automatic-gain-control amplifier for amplifying the output of the amplifier having the limiting function, to produce a signal having a constant swing. The amplifier having the limiting function and the circuit stage performing its function are referred to below as the "present limiting amplifier" and the "present limiting amplification stage", respectively.

The predetermined voltage at which the present limiting amplifier starts its limited amplification is desirably set larger than the difference between the output signal of the preamplifier in the minimum receiver sensitivity and the reference voltage. The output signal by the preamplifier in the minimum receiver sensitivity is determined at a desired error rate by the photoelectric converter and the preamplifier.

The output signal swing of the amplifier having the limiting function is desirably restricted to satisfy the following formula within a desired dynamic range of the optical signal:

$$\Delta VAWL < Rs \cdot \Delta t \qquad \text{(Formula 1)}$$

In Formula 1, $\Delta VAWL$ is the output signal swing of the amplifier having the limiting function, $\Delta t$ is the time period to be occupied by an optical signal representing 1 bit, and Rs is the slew rate of the amplifier having the limiting function.

The photoelectric converter is preferably constructed of an avalanche photodiode APD or an erbium-doped fiber amplifier EDFA and a PIN photodiode in combination, so that the minimum receiver sensitivity can be improved.

When the optical signal intensity is weak, the amplifier with the limiting function linearly amplifies the voltage signal VPRE according to the optical signal. The AGC amplifier disposed at the next stage thereto amplifies the output AWL of the amplifier with the limiting function, and the AGC amplifier provides its output voltage signal VAGC to the decision circuit. The decision circuit sets its reference voltage to decide whether the input signal VAGC is "1" or "0", corresponding to the signal swing of the VAGC (the voltage difference between the signals of "1" and "1"). Thus, the linear amplifications of the voltage signal by the amplifier with the limiting function and the AGC amplifier enable the decision circuit to set its reference voltage to an optimum point, even if the optical receiver accepts fairly weak optical signals. When the optical signal intensity is high, on the other hand, the amplifier with the limiting function acts to limit the output signal swing so as to prevent the output signal of the preamplifier from distorting and to suppress an increase of the error rate.

In a preferred embodiment of the invention, an optical transmission system terminal unit or an optical transmission system includes, in combination, an optical receiver including an optical receiving element (photoelectric converter), a first amplifier (which may be a preamplifier) for converting a current signal output from the optical receiving element into a voltage signal, a second amplifier (which may be a gain-controllable amplifier or an AGC amplifier) for reducing the swing dispersion of the voltage signal output from the first amplifier, a decision circuit for processing (or deciding) the voltage signal output from the second amplifier, and a third amplifier disposed between the first amplifier and the second amplifier. Specifically, the following functions are required for the third amplifier mentioned above. One function is to set its output signal swing (like $\Delta VAWL$ in FIG. 9) smaller than the product of the slew rate of the third amplifier and the time period occupied by one bit of an optical signal.

Another function required for the third amplifier is to amplify the voltage signal input from the first amplifier thereto when the voltage signal has a smaller swing than a predetermined voltage swing. This function is important for detecting the input signal of an especially minute swing. As a result, the linearly amplified range of the third amplifier is set to be wider than that of the limiting amplifier of the prior art. Generally, the gain drops if the linear amplification range is extended, but the third amplifier is utilized in combination with the second amplifier at a downstream stage, so that no practical problem arises.

According to the present invention, when the optical signal intensity is weak, the amplifier with the limiting function acts as a linear amplification so that the reference value of the decision circuit can be set to the optimum point by executing a further linear amplification in the AGC amplifier at the downstream stage. When the optical signal intensity is strong, the amplifier with the limiting function performs a limiting action to prevent the output signal swing of the preamplifier from being distorted, which would increase the error rate. As a result, the optical receiver has a high sensitivity and a wide dynamic range.

DETAILED DESCRIPTION OF THE PREFERRED EMBODIMENTS

Figure 1:
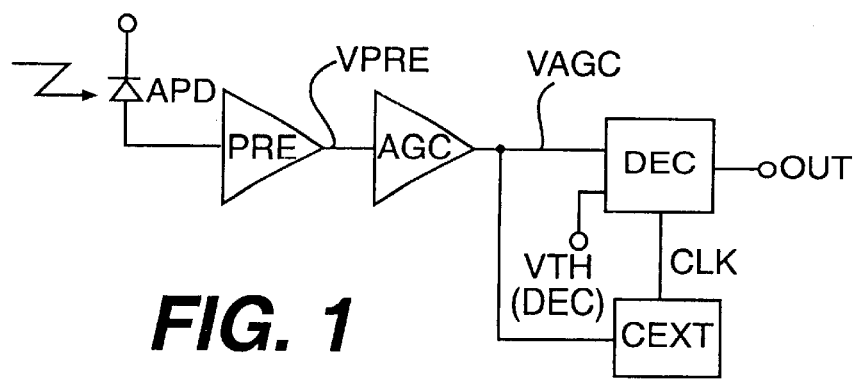
FIG. 1 schematically illustrates a conventional optical receiver.
Figure 2A:
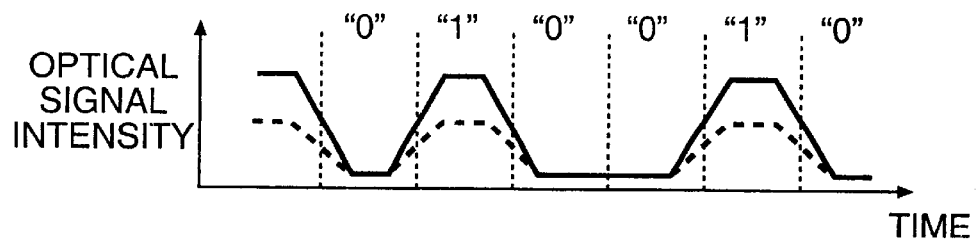
FIGS. 2(a)–2(c) illustrate the relationships between an optical signal input and the voltage output of the preamplifier and the AGC amplifier of the circuit shown in FIG. 1.
Figure 2B:
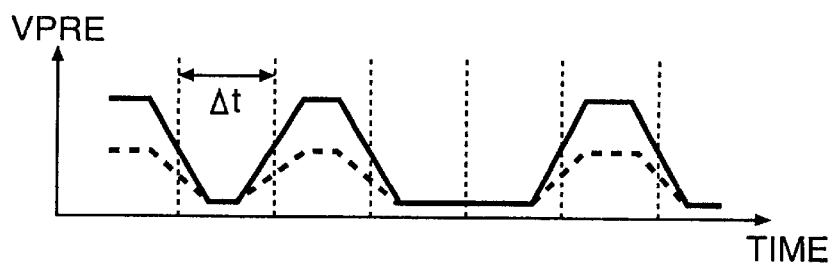
Figure 2C:
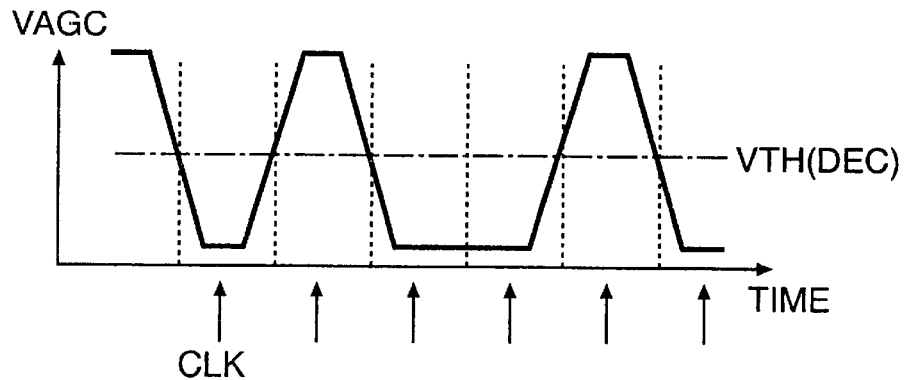
Figure 3:
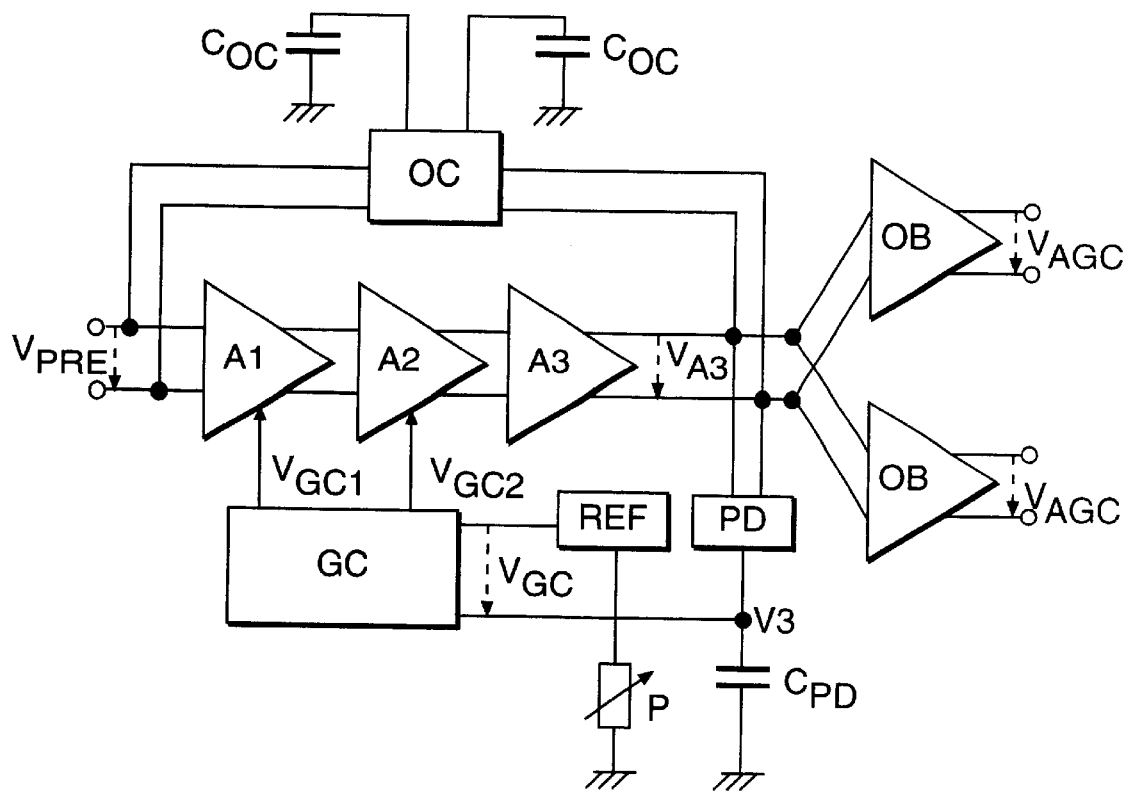
FIG. 3 illustrates details of the AGC amplifier of the circuit shown in FIG. 1.
Figure 9:
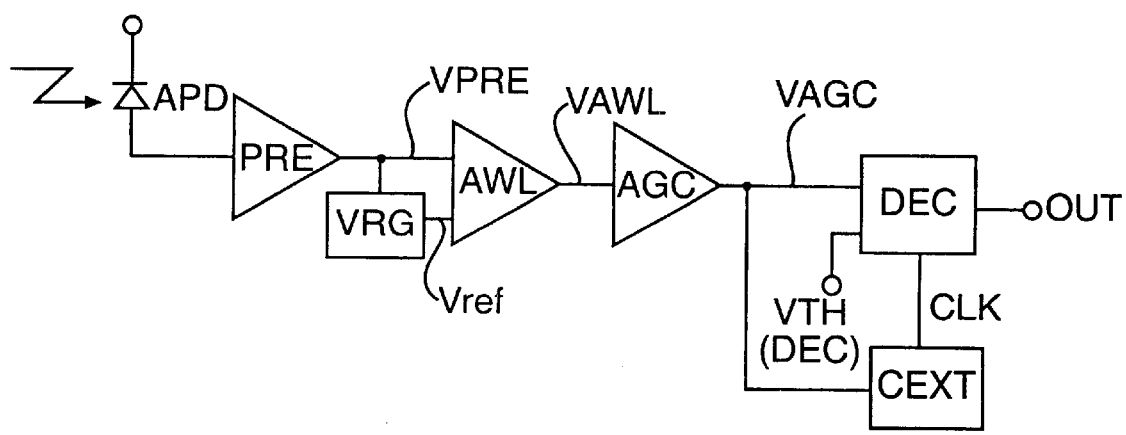
FIG. 9 schematically illustrates an optical receiver constructed according to the teachings of the present invention.

FIG. 9 illustrates fundamental features of a preferred embodiment of the present invention. In significant aspects, the construction shown in FIG. 9 differs from that of FIG. 1 by including an amplifier with a limiting function AWL and a reference voltage generator VRG between the preamplifier PRE and the gain-controllable amplifier AGC. Comparing the circuit of FIG. 9 with that of FIG. 7, both have an amplifier with a limiting function for receiving the output of the preamplifier PRE, as well as circuitry for receiving the preamplifier output and providing the amplifier with the limiting function with a reference voltage. However, the amplifier AWL of FIG. 9 provides a linear amplification to an input signal that has a small swing, but the limiting amplifier LA of FIG. 7 does not. Thus, the amplifier AWL of the present invention acts as a linear amplifier that holds the output swing generally at a constant value by a limiting function only when the output swing exceeds the constant value.

Figure 10:
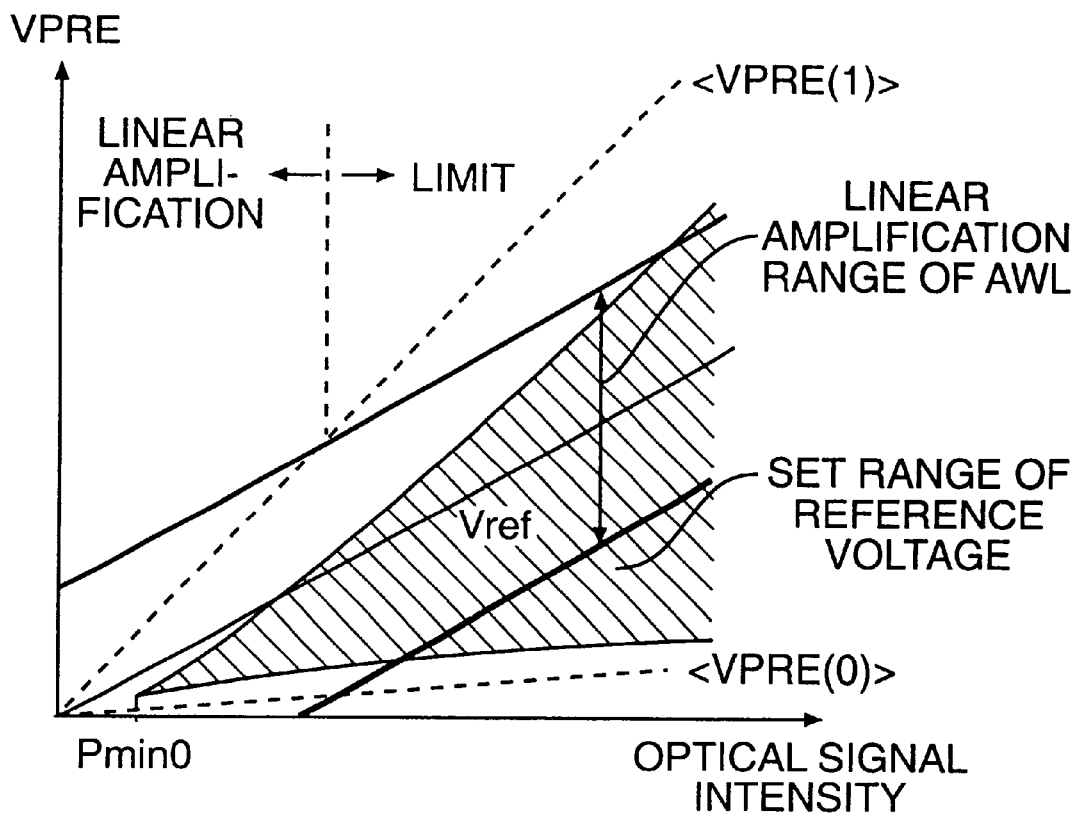
FIG. 10 illustrates the setting of a range of a reference voltage for the circuit shown in FIG. 9.

With reference to FIG. 10, the set range of the reference voltage for the preamplifier output VPRE will be explained next. The reference voltage Vref of the amplifier AWL is preferably set just at the center between the preamplifier output signals VPRE(0) and VPRE(1), both of which are illustrated by broken curves. The linear amplification range (or the ordinate width, as defined by thick oblique curves) of the AWL is far wider (e.g., several hundreds mV) than that of the limiting amplifier of the prior art. As a result, the optical signal intensity is linearly amplified to output a voltage signal VAWL at the minimum receiver sensitivity Pmin0, as illustrated in FIG. 10. By performing a further linear amplification using the AGC amplifier of the downstream stage as in the circuit of FIG. 1, therefore, the reference voltage of the decision circuit can be set to the optimum point (defined by the voltage (value) along the axis of VPRE within the hatched region of FIG. 10) for the optical signal intensity. When the optical signal intensity is high, on the other hand, the output voltage swing of the VAWL is limited or suppressed to a predetermined value irrespective of the magnitude of VPRE, so that the output signal swing of the AWL does not become excessive. As a result, waveform distortions caused by the slew rate can be suppressed to extend the dynamic range of the receiver.

Figure 7:
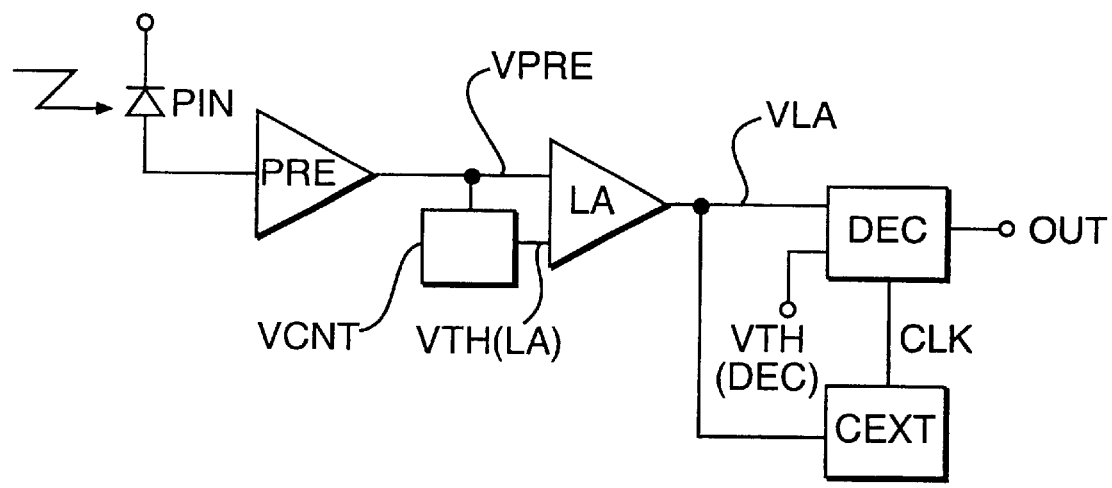
FIG. 7 illustrates another conventional optical receiver.
Figure 6A:
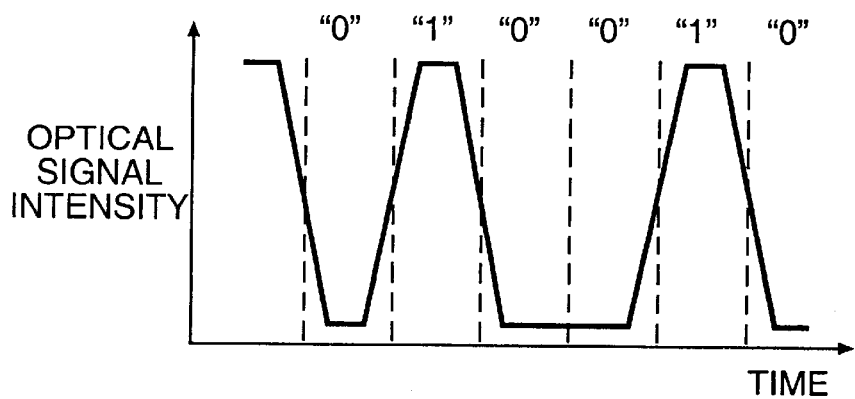
FIGS. 6(a)–6(c) illustrate waveform distortions due to slew rate.
Figure 6B:
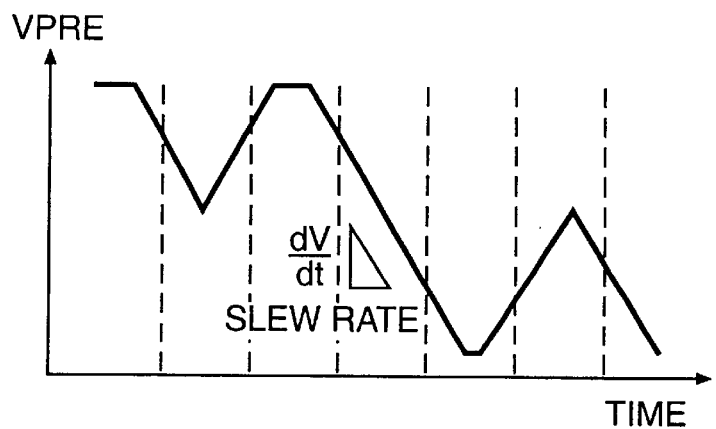
Figure 6C:
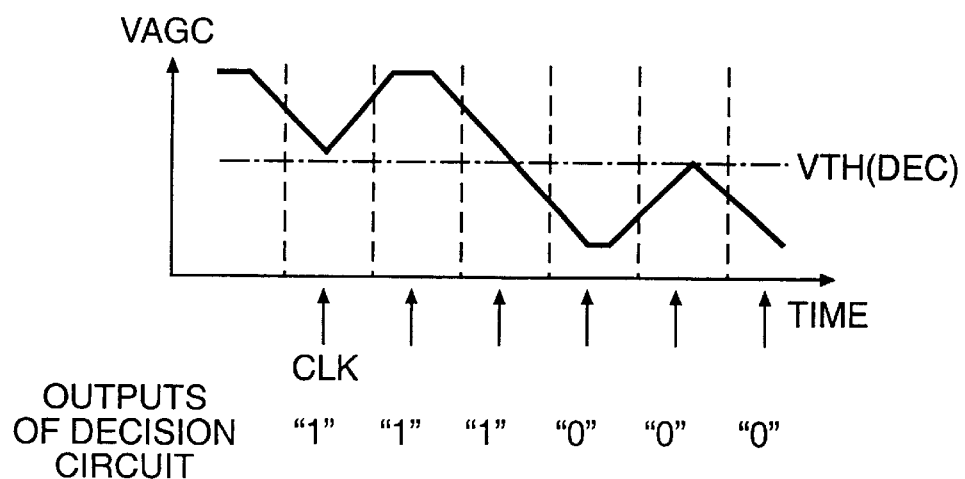
Figure 8:
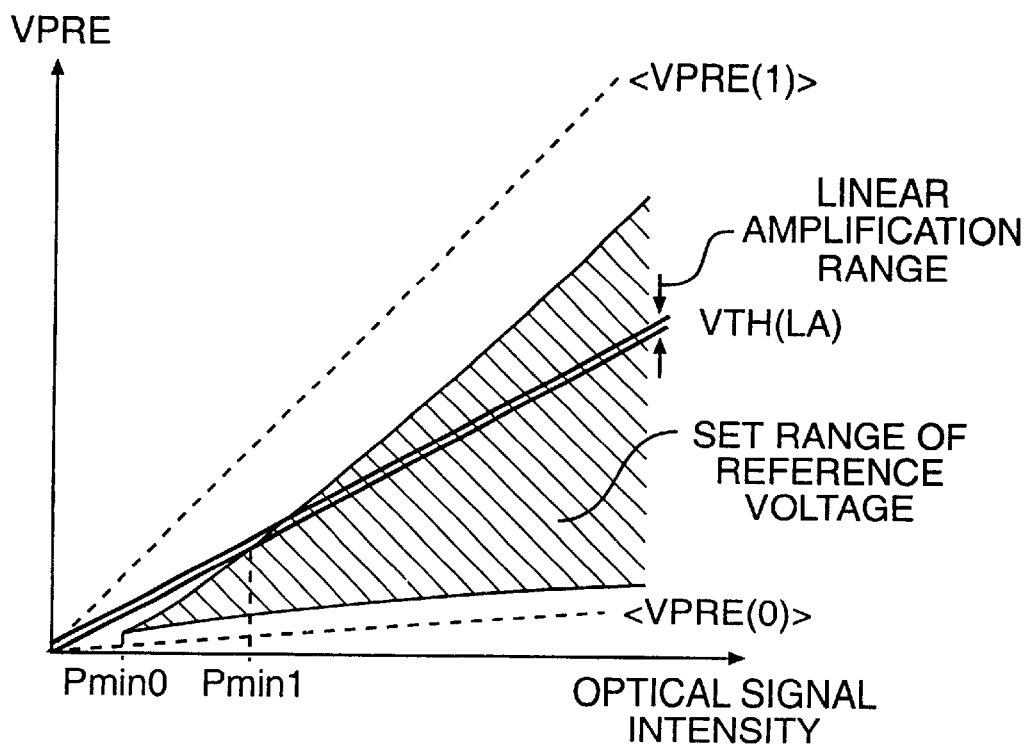
FIG. 8 illustrates the setting of a range of a reference voltage above a minimum receiver sensitivity for the circuit shown in FIG. 7.

With reference to FIGS. 11(a)–11(f), functional features of the present invention will be compared with those of the circuitry shown in FIG. 7. The optical signal intensity is assumed to be located between Pmin1 and Pmin0 (see FIG. 8).

Figure 4:
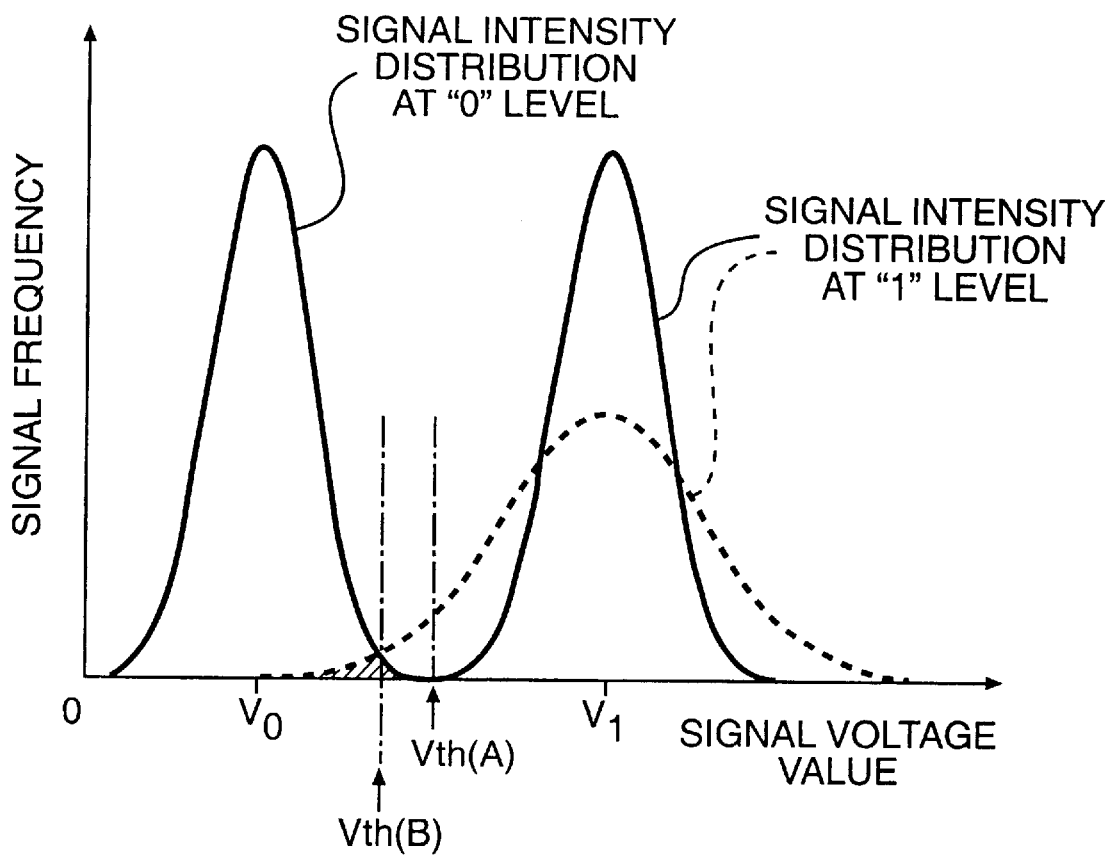
FIG. 4 illustrates the error rate of "1"–"0" signal decision-making.
Figure 5:
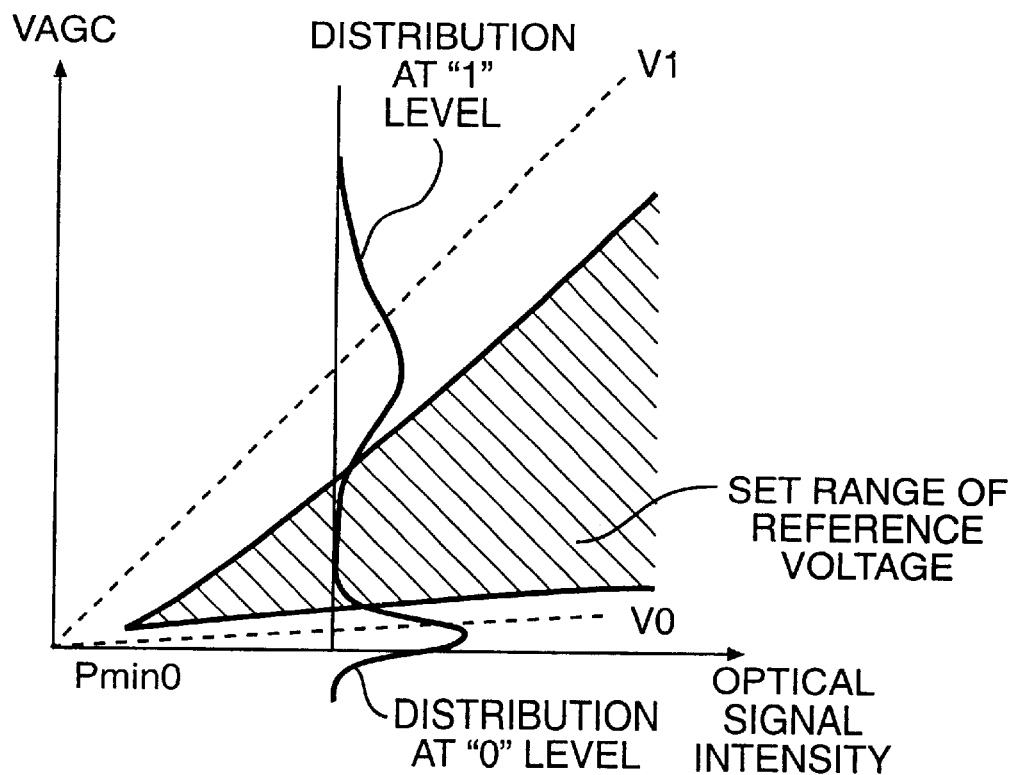
FIG. 5 illustrates the setting of a range of a reference voltage above the minimum receiver sensitivity, for the circuit shown in FIG. 1.
Figure 11A:
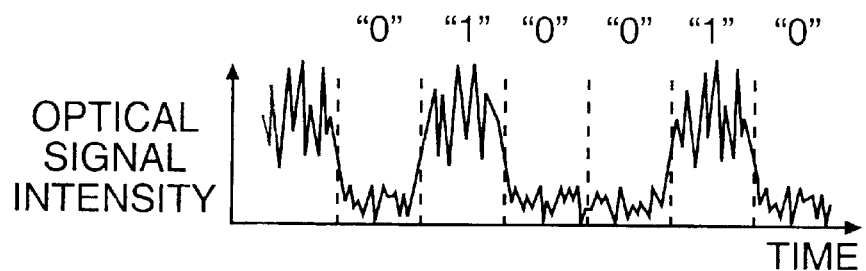
FIGS. 11(a)–11(f) compare various output signals of the circuit shown in FIG. 7 with those of the circuit shown in FIG. 9.
Figure 11B:
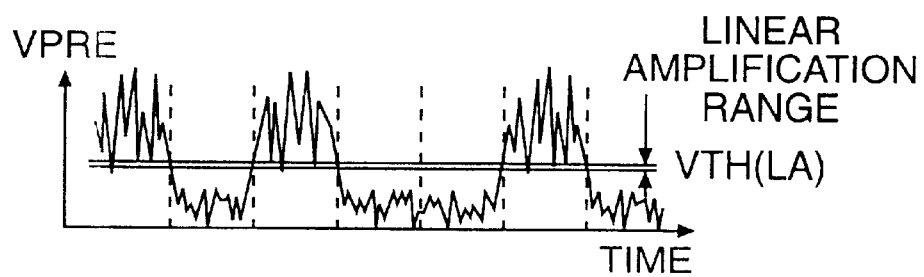
Figure 11C:
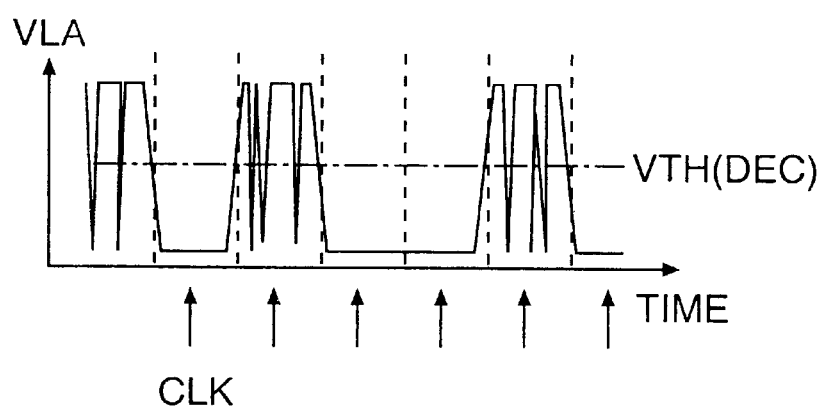

FIGS. 11(a)–11(c) respectively illustrate the optical signal, preamplifier output, and limiting amplifier output when the optical receiving element is an APD or the combination of an EDFA and PIN diode. As shown schematically in the drawing, noise is superposed over the signals, in correspondence with the signal distribution shown in FIG. 4. Particularly, the noise superposed over the "1" signal is greater than that superposed over the "0" signal.

The reference voltage VTH(LA) of the prior (or, conventional) limiting amplifier is set just intermediate between the average voltage of the "1" signal output and the average voltage of the "0" signal output of the preamplifier.

The gain of the prior limiting amplifier is set so that the linear amplification range is several mV at most. Specifically, only a signal in the linear amplification range defined between the two thick curves is linearly amplified, whereas signals outside the region defined by the two thick curves are ignored, so that a constant voltage is output. Therefore, the limiting amplifier output VLA takes the waveform shown in FIG. 11(c), whereby the "0" signal can be correctly decided, but the "1" signal is buried in noise and cannot be decided correctly.

Figure 11D:
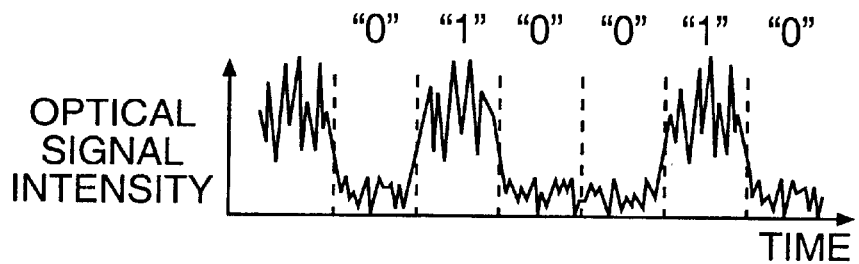
Figure 11E:
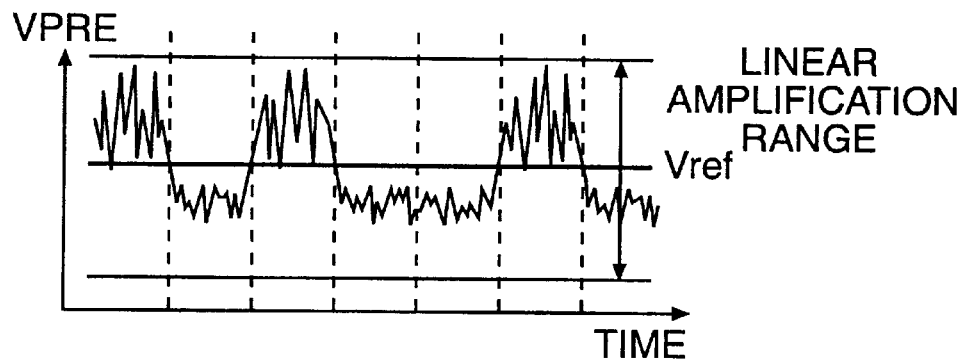
Figure 11F:
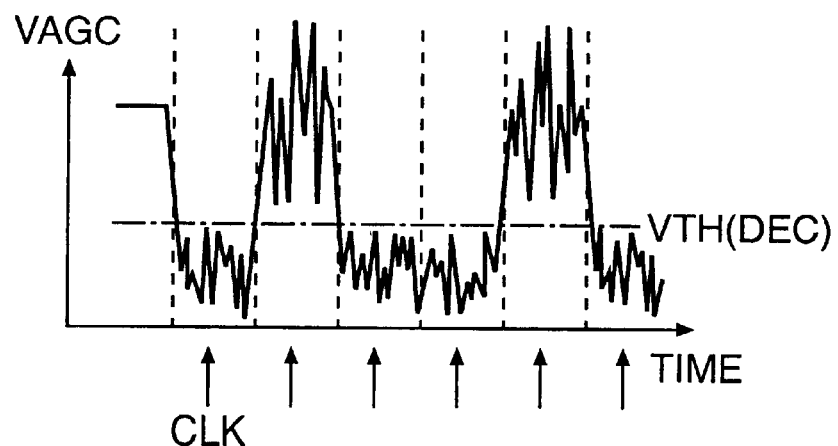

Referring to FIGS. 11(d)–11(f), on the other hand, the reference voltage of the present invention is set at the same level as that of VTH(LA), but the linear amplification range is as wide as several hundred mV, so that the preamplifier output VPRE is linearly amplified by AWL and further by the AGC amplifier, to achieve a signal VAGC having a desired swing. As a result, the output of the AGC amplifier is a faithful reproduction of the input optical signal waveform (that is, the optical signal is converted faithfully to an electric signal without eliminating or altering any data present in the optical signal). If the decision signal VTH (DEC) is set slightly closer to the "0" peak with respect to the VAGC, therefore, it is possible to decide the signal normally.

Figure 12:
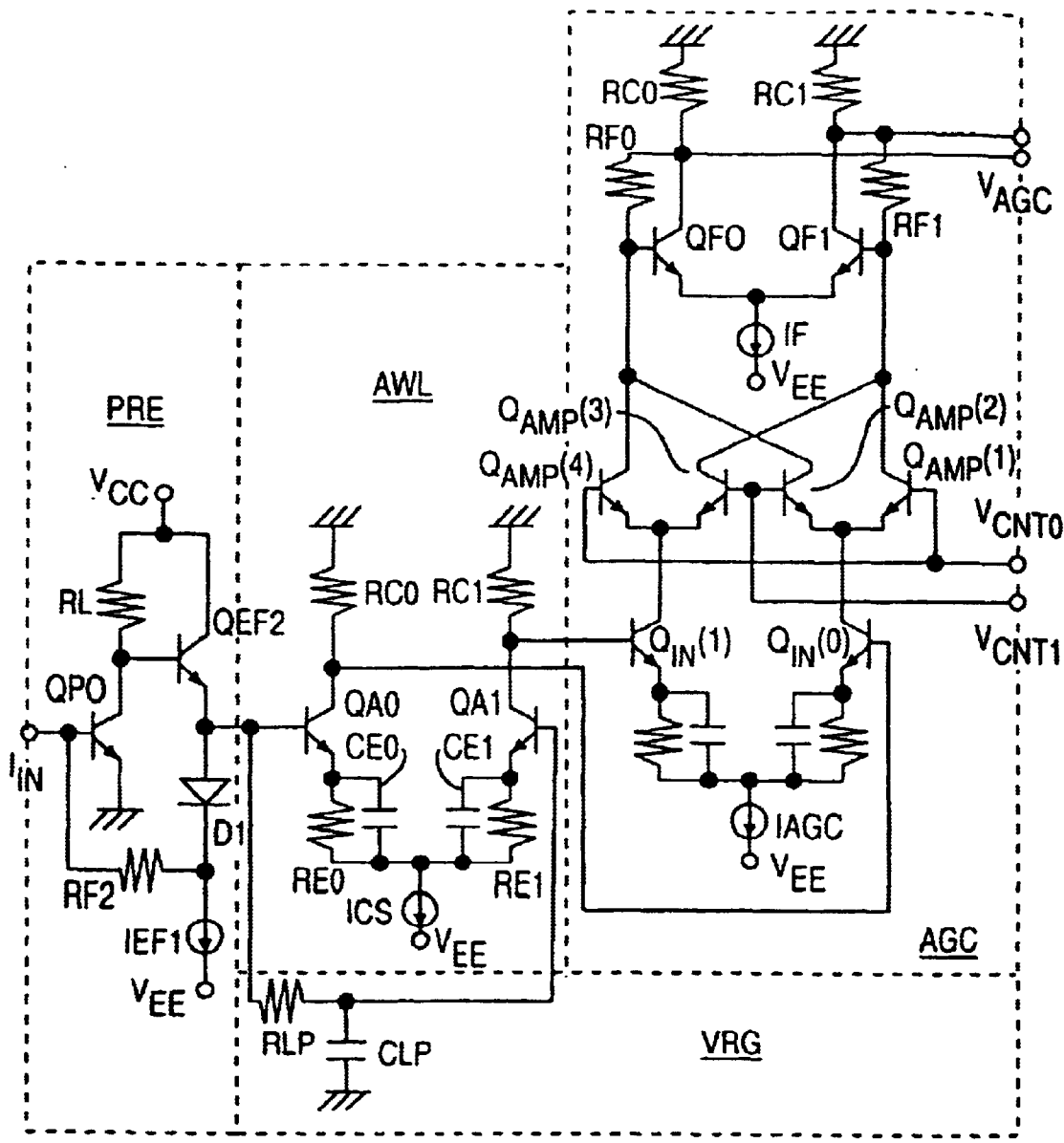
FIG. 12 illustrates more detailed circuitry of the circuit shown in FIG. 9.

FIG. 12 illustrates certain circuit elements of FIG. 9 in greater detail. FIG. 12 omits the construction of the optical receiving element, the decision circuit, and the clock-extraction circuit.

The signal current from the optical receiving element is input to a terminal $I_{IN}$ of the preamplifier PRE. The AGC amplifier has a dedicated output terminal $V_{AGC}$ for providing an input to the decision circuit DEC and to the clock-extraction circuit CEXT. Further details of the circuitry shown in FIG. 12 and related embodiments will be discussed next. The optical receiver, however, is not limited to the circuitry shown in FIG. 12 or the related embodiments discussed below, but can take a variety of modes that are exemplified by the disclosed embodiments.

Figure 13:
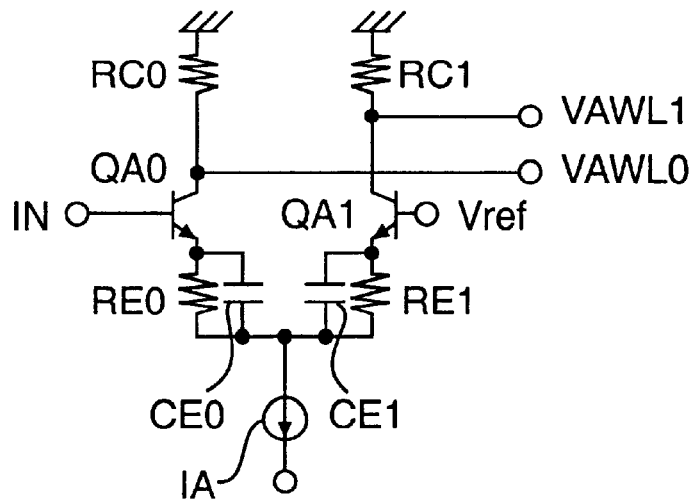
FIG. 13 shows an example of an amplifier employed in the circuit of FIG. 9.

Turning to FIG. 13, an embodiment of an amplifier with a limiting function AWL is discussed. The amplifier AWL includes a differential amplifier constructed of bipolar transistors QA0 and QA1. When the signal input to terminal $I_N$ is close to the reference voltage Vref, the amplifier AWL acts as a linear amplifier having a gain A generally expressed by the following formula:

$$A=RC/((2VT/IA)+RE) \qquad \text{(Formula 2)}.$$

In Formula 2, RC is the resistance of the load resistance RC0, RE is the resistance of the emitter resistance RC0. VT=q/kT, and IA is the bias current of the differential amplifier, wherein q, k, and T designate the amount of charge of an electron, Boltzmann's constant, and temperature, respectively. The differential amplification circuit shown in FIG. 13 needs to have its left circuit (comprising RC0, QA0, RC0, and CE0) be symmetrical with its right circuit (comprising RC1, QA1, RE1 and CE1), each of which expands from the ground level in the upper part of this figure to the constant current source in the bottom part of this figure. Practically, an error (a difference) of 3% at most can be allowed in a parameter (resistance, capacitance, etc.) of each circuit element between left and right; however, this error is deleted for designing the circuit. Thus, according to the circuit diagram, the resistance of RC1 is set to be equal to RC0 and RC, and the resistance of RE1 is set to be equal to RC0 and RE.

The linear amplification range VLR is generally expressed by the following formula:

$$VLR=2RE \cdot IA \qquad \text{(Formula 3)}.$$

The capacitors CE0 and CE1 are peaking capacitors acting to improve the gain at high frequencies and to widen the bandwidth.

Figure 14:
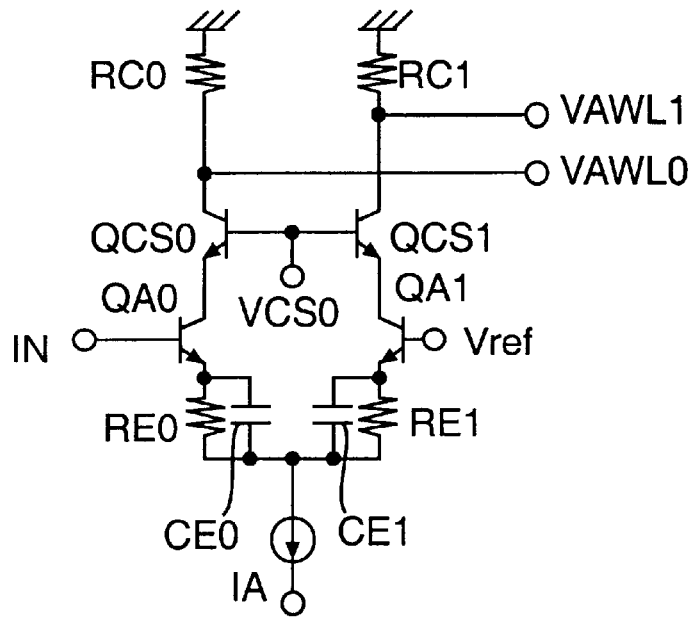
FIG. 14 shows an example of another amplifier that may be used in the circuit of FIG. 9.

FIG. 14 shows another embodiment of the amplifier AWL. This embodiment is different from that shown in FIG. 13 in that cascode transistors QCS0 and QCS1 are connected with the collectors of transistors QA0 and QA1. The gain and the linear amplification range are expressed as in the embodiment shown in FIG. 13 by Formulas 2 and 3. By connecting the cascode transistors, the Miller capacitance of the transistor QA0 can be reduced, and the bandwidth can be widened more than in the embodiment of FIG. 13.

Figure 15:
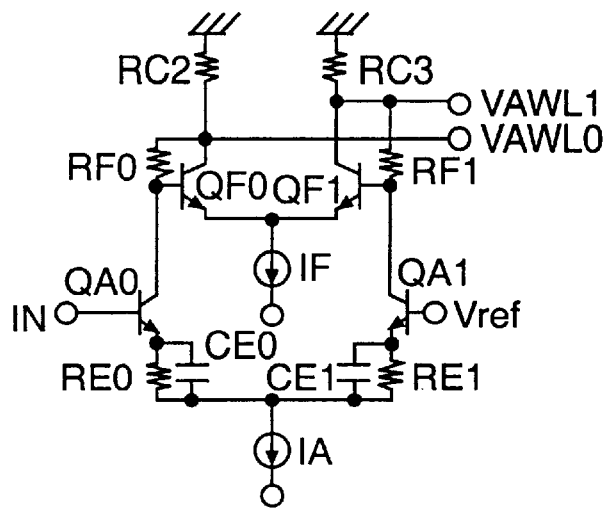
FIG. 15 illustrates yet another amplifier that may be used in the circuit of FIG. 9.

FIG. 15 shows another embodiment of the amplifier AWL, which uses a transimpedance circuit as the load circuit in place of the resistances RC0 and RC1. Transistors QF0 and QF1, resistances RF0, RF1, RC2, and RC3, and a current source IF constitute the transimpedance circuit, which acts to lower the input impedance as viewed from the collectors of the transistors QA0 and QA1, and to reduce the Miller capacitance. As a result, the bandwidth can be widened more than that of the embodiment shown FIG. 13.

The gain A of the circuit shown in FIG. 15 can be generally expressed by the following formula:

$$A=RF/((2VT/IA)+RE) \qquad \text{(Formula 4)}.$$

In Formula 4, RF is the resistance of the feedback resistance RF0. The differential amplification circuit shown in FIG. 15 needs to have its left and right circuits be symmetrical with each other expanding from the ground level downward to the constant current source in FIG. 13. Thus, although a difference in the resistance between RF0 and RF1 can be 3% at most in practice, RF1 must be set equal to RF0 for designing this circuit. The linear amplification range is expressed by Formula 3.

In each of the embodiments of FIGS. 13–15, the output is extracted directly from the differential amplifier, but the output may be extracted, if necessary, through a buffer circuit, such as an emitter follower.

Figure 16:
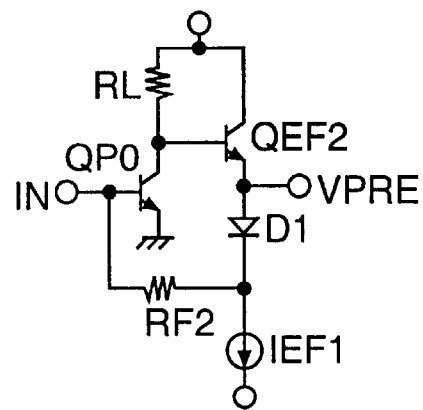
FIG. 16 illustrates an example of a preamplifier that may be used in the circuit of FIG. 9.

FIG. 16 shows a preferred embodiment of the preamplifier PRE of the present invention, embodied as a transimpedance amplifier. The transimpedance $Z_T$ of the present circuit is substantially equal to RF2. The reason why $Z_T$ equals RF2 is explained with reference to the following Formula 5, defining the transimpedance $Z_T$:

$$Z_T=(RF2 \cdot A_0)/(1+A_0) \qquad \text{(Formula 5)}$$

In Formula 5, $A_0$ is the gain of the circuit comprising the transistor QP0 and the load resistance RL, and RF2 is the resistance of RF2, shown in FIG. 16. The circuit comprising QP0 and RL is designed to have a large gain $A_0$ so that the following Formula 6 becomes approximately effective:

$$A_0/(1+A_0) \qquad \text{(Formula 6)}$$

According to Formula 6, it is clear that the transimpedance $Z_T$ can be expressed approximately as RF2.

On the other hand, the bandwidth of the preamplifier is dominated by the pole, which is determined by the product of the capacitance of the input unit (i.e., the input capacitance of the preamplifier and the capacitance of the photodiode) Cin and the input resistance of the preamplifier Zin. The pole is denoted by the time constant of τ=Resistance×Capacitance as −2π/τ. Therefore, the pole becomes larger (the time constant becomes smaller), and the preamplifier can respond to the received optical pulses more quickly. In other words, the larger pole enables the preamplifier to receive optical signals transmitted at shorter intervals. The input resistance Zin mentioned above is generally expressed by the following Formula 7:

$$Zin=RF2/AE \quad \text{(Formula 7)}.$$

In Formula 7, AE is the open loop gain of an emitter common amplifier. According to Formula 7, the open loop gain can be retained so large even at high frequencies (setting the Zin smaller) that the bandwidth for receiving the optical signals can be widened.

Figure 17:
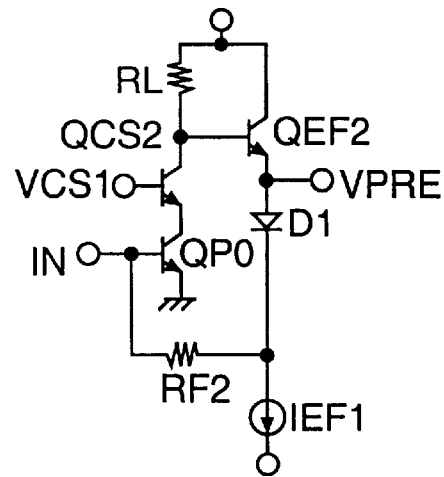
FIG. 17 illustrates another example of a preamplifier that may be used in the circuit of FIG. 9.

FIG. 17 shows another embodiment of the preamplifier, using a cascode connection. This embodiment is different from that of FIG. 16 in that the cascode transistor QCS2 is connected with the collector of the transistor QP0. By connecting the cascode transistor in this manner, the Miller capacitance of the transistor QP0 can be reduced, to reduce the input capacitance of the preamplifier. As a result, the bandwidth can be made even wider. However, since the phase margin of the feedback loop is reduced, the flatness of the frequency response must be considered.

In each of FIGS. 16 and 17, the output is made through a one-stage emitter follower, but the emitter follower may have additional stages, if necessary.

Figure 18:
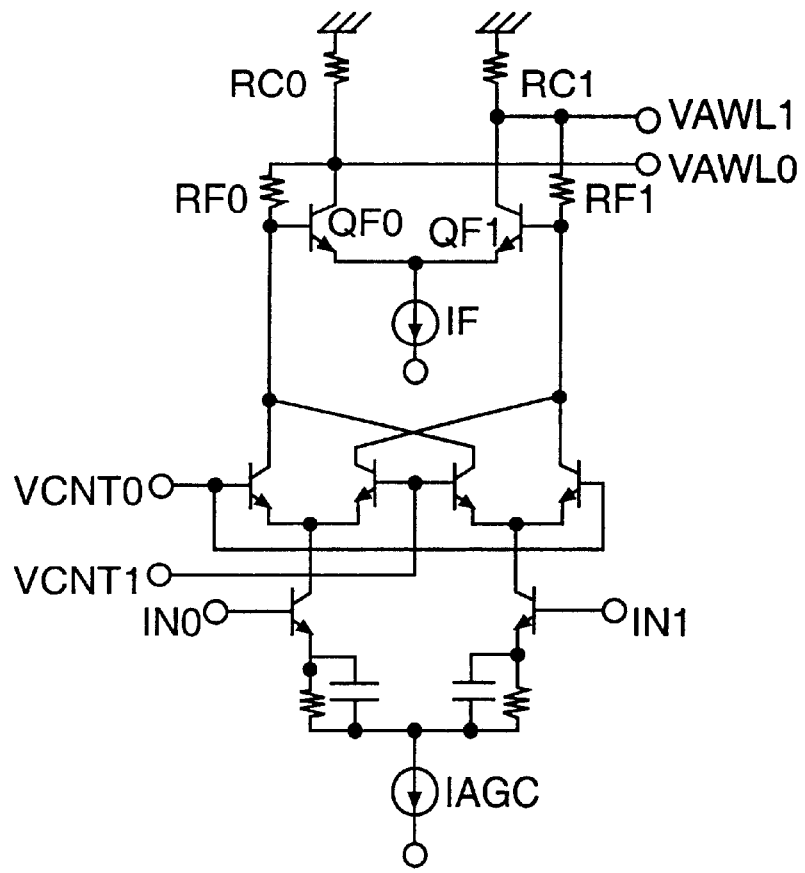
FIG. 18 illustrates an example of an AGC amplifier that may be used in the circuit of FIG. 9.

FIG. 18 shows an example of an AGC amplifier suited for the optical receiver of the present invention. In this embodiment, a transimpedance circuit is employed as the load circuit, which can be a resistor. For example, the terminal IN0 in FIG. 18 is connected to one of the terminals of VAWL0 in FIGS. 13, 14 and 15, and the terminal IN1 in FIG. 18 is connected to one of the terminals of VAWL0 in FIGS. 13, 14 and 15, respectively. The gain of the AGC amplifier is increased if the voltage difference between control signals VCNT0 and VCNT1 is enlarged, and decreased if the voltage difference is reduced. A plural-stage cascade amplifier may be employed when the gain is too small with one stage of the present circuit. The control signals VCNT0 and VCNT1 may by controlled by a technique combining a peak detector PD, a reference circuit REF, and a gain controller GC, as disclosed in FIG. 1, for making the setting by detecting the swing of the VAGC and by comparing it with a nominal voltage VN.

Although this embodiment has been described with the output extracted directly from the AGC amplifier, the output may be extracted through a buffer circuit such as an emitter follower.

Figure 19:
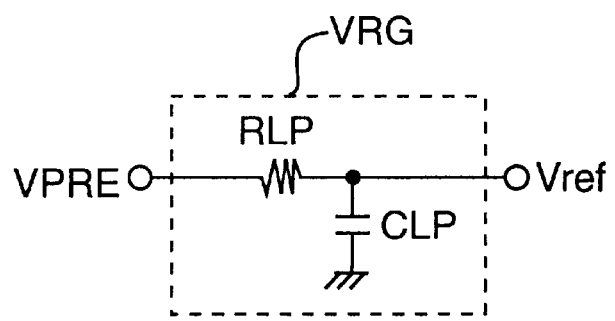
FIG. 19 illustrates an example of a reference voltage generator that can be used in the circuit of FIG. 9.

FIG. 19 shows an embodiment of a reference voltage generator VRG constituted by a low-pass filter constituted by a resistance RLP and a capacitance CLP. Here, this capacitance CLP may be either disposed in a semiconductor chip or connected from the outside. The center voltage of the preamplifier output VPRE can be obtained and output as the reference voltage Vref by extracting the DC component from VPRE using the low-pass filter.

Figure 20:
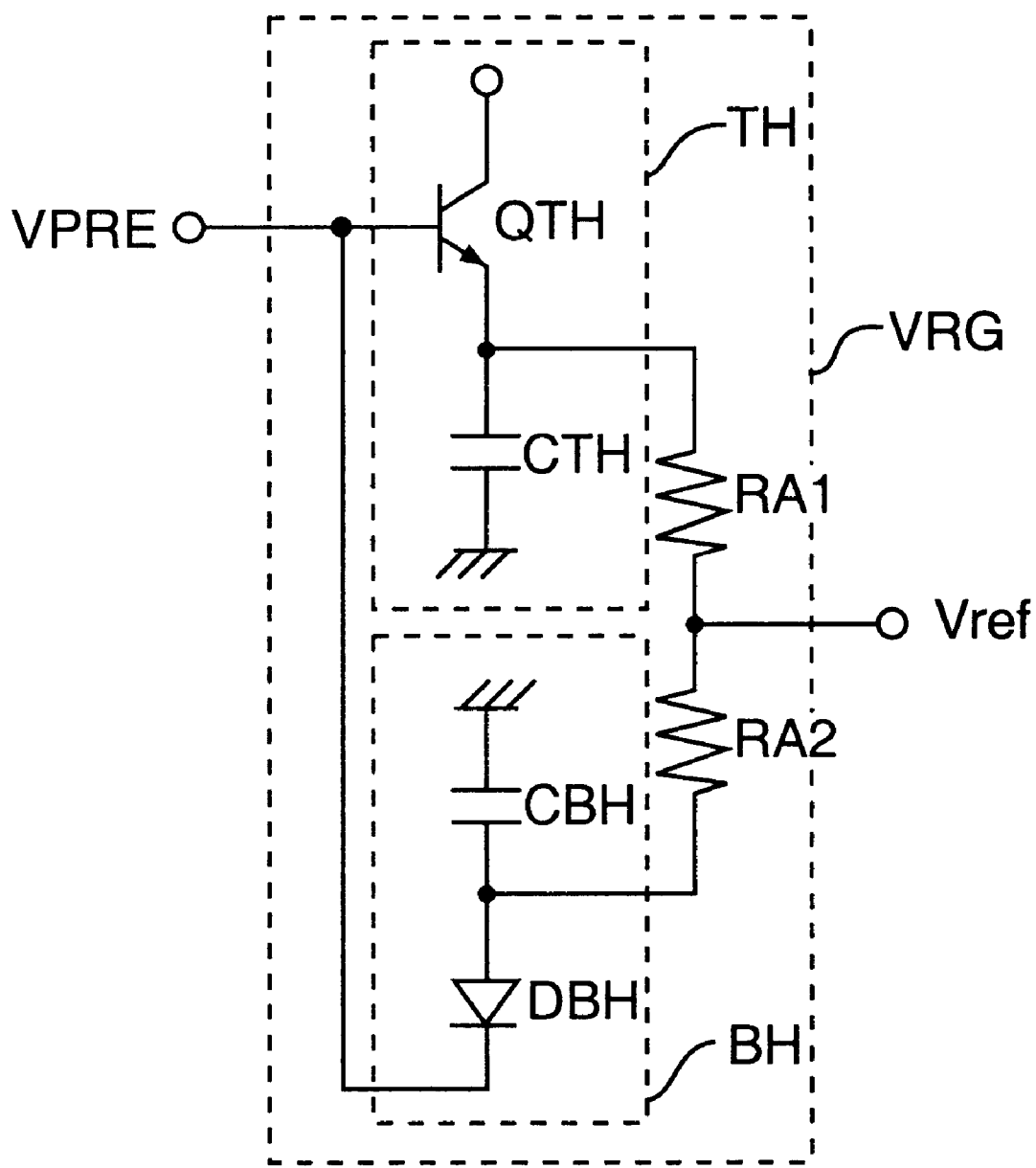
FIG. 20 illustrates another example of a reference voltage generator that can be used in the circuit of FIG. 9.

FIG. 20 shows another possible embodiment for the reference voltage generator. The present circuit is composed of a circuit TH for detecting the high voltage of the preamplifier output VPRE(H), a circuit BH for detecting the low voltage VPRE(L), and resistances RA1 and RA2. These resistances are set equal to each other. When VPRE takes a high voltage, the capacitance CTH is charged by the transistor QTH to a voltage of VPRE(H)−VBE, wherein VBE is a bias voltage between the base and emitter of the transistor QTH. When the preamplifier output takes a low voltage, the capacitance CBH is discharged by the diode DBH to a voltage of VPRE(L)+VBE. When these two voltages are divided by the resistances RA1 and RA2, it is possible to generate a voltage just at the center between the high voltage and the low voltage of the preamplifier output VPRE.

Figure 21:
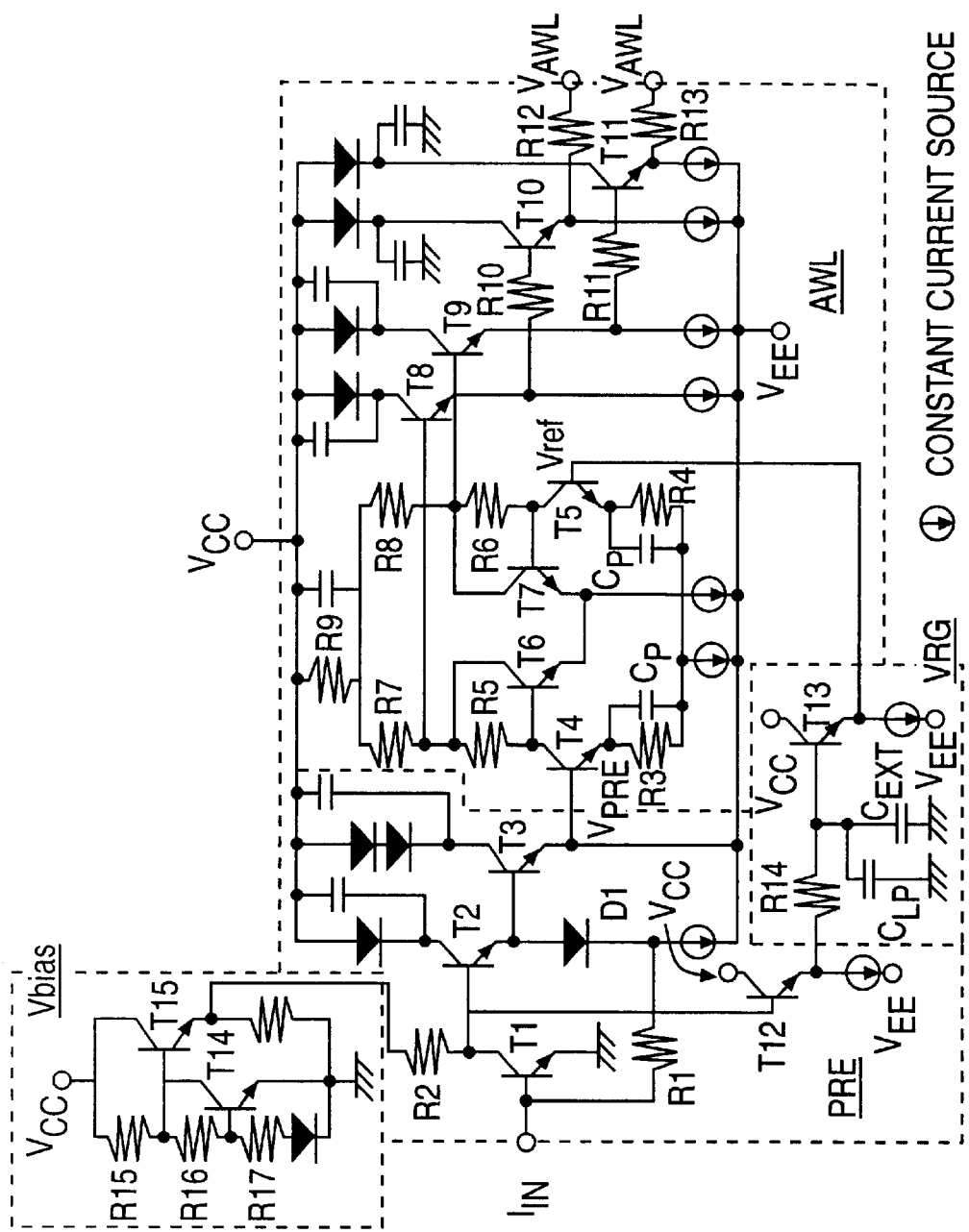
FIG. 21 illustrates another embodiment of an optical receiver constructed according to the teachings of the present invention.

FIG. 21 shows another embodiment for the optical receiver shown in FIG. 9. FIG. 21 does not show all of the elements of the FIG. 9 circuit, omitting the optical receiving element, the AGC amplifier, the decision circuit, and the clock-extraction circuit, although these elements are present in the optical receiver. The $I_{IN}$ terminal of the preamplifier PRE is fed with the signal current from the optical receiving element, and the $V_{AWL}$ terminal of the amplifier AWL is electrically connected with the voltage signal input terminal of the AGC amplifier.

As shown in FIG. 21, the optical receiver receives the signal current $I_{IN}$, which is generated by the optical receiving element in accordance with the input optical signal, which may be transmitted at 10 Gb/s, over a wide dynamic range leading to the swing current value of 2 mA at most. In order to receive an input current signal $I_{IN}$ that has a wide dynamic range with a high transimpedance gain, the optical receiver includes a transimpedance amplification stage constituted by the preamplifier PRE, a present limiting amplification stage constituted by the present limiting amplifier AWL, and a reference voltage generator VRG for feeding the reference voltage Vref to the present limiting amplifier AWL. A bias voltage feeder Vbias feeds the bias voltage to the preamplifier PRE. Each unit is equipped with terminals for receiving supply voltages $V_{CC}$ and $V_{EE}$ (wherein $V_{EE}<V_{CC}$), and constant current sources (indicated by circled arrows) are provided at transistor emitters as shown.

The reference voltage generator, composed of the low-pass filter having the external capacitor CEXT, outputs the intermediate value of the output swing voltage, as generated by the transimpedance amplification stage, as the reference voltage Vref. One transistor T4 of the differential amplifier in the present limiting amplifier AWL receives the preamplifier output voltage VPRE at its base, and the other transistor T5 receives the reference voltage Vref at its base. As a result, linear amplification is performed at both the transimpedance amplification stage and the present limiting amplification stage for the signal current $I_{IN}$ to establish a high impedance gain if the $I_{IN}$ value is small, but the impedance gain is suppressed to a desired value by the limiting amplification function of the present limiting amplification stage if the $I_{IN}$ value is large.

Figure 22A:
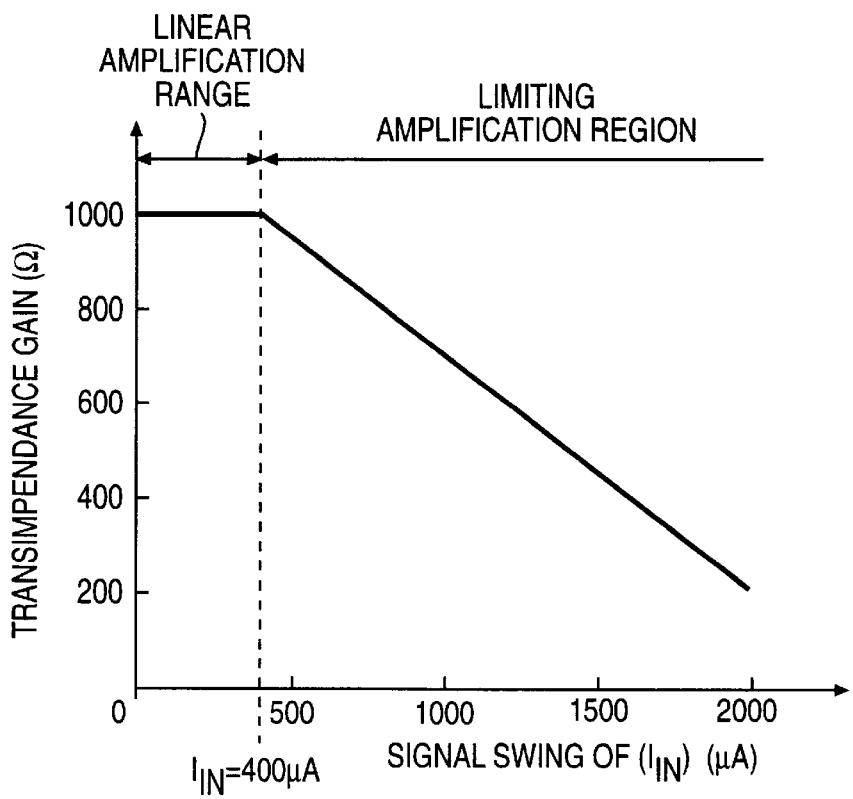
FIGS. 22(a)–22(b) plot the relationships between the output signal swing and the input current of the photoelectric converter shown in the circuit of FIG. 21.
Figure 22B:
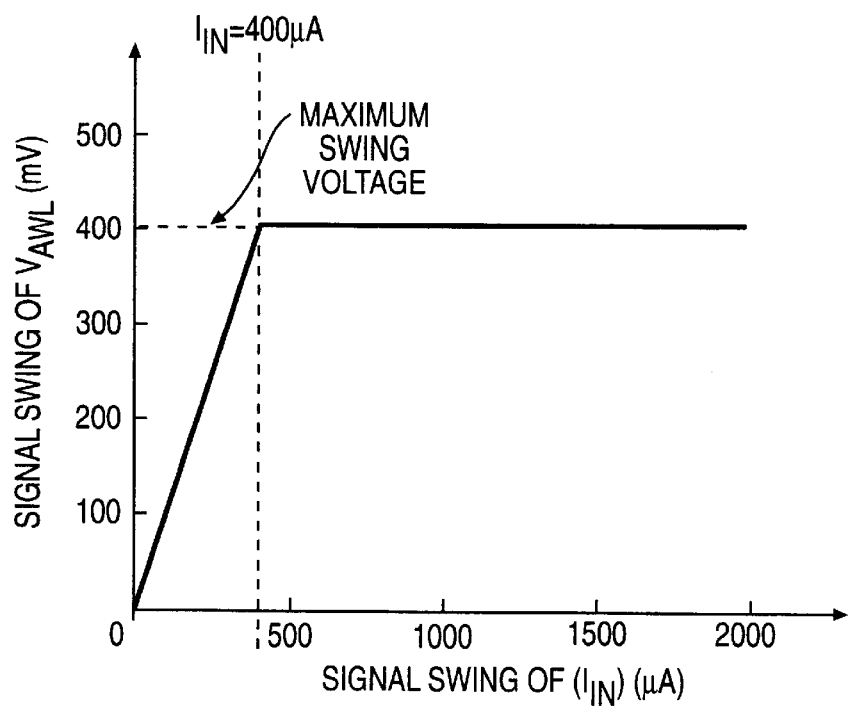

More specifically, as shown in FIG. 22, the present limiting amplification stage exhibits the linear amplification function for a signal current $I_{IN}$ less than about 400 µA, which is predetermined by the circuitry of the present limiting amplifier AWL, and exhibits the limiting function for a signal current greater than 400 µA irrespective of the value of $I_{IN}$. As a result, in the present limiting amplification stage, a weak signal $I_{IN}$ can be transmitted without fail to the AGC amplifier, and the distortion of the output signal waveform can be suppressed even if the dynamic range of $I_{IN}$ extends from several µA to 2 mA. Consequently, the present limiting amplification stage keeps and improves the signal decision accuracy in the decision circuit DEC.

In FIG. 21, the preamplifier PRE includes an emitter common amplifier having the transistor T1 and the resistance R2, and a shunt feedback loop having the transistor T2, the diode D1, and the resistance R1. The present limiting amplifier AWL has a wide-band differential amplifier and an output buffer. To improve the frequency response characteristics of these two amplifiers, moreover, the bias voltage feeder Vbias is connected with the preamplifier PRE, and the peaking network is connected with the present limiting amplifier AWL.

In the preamplifier PRE, in order to suppress the transimpedance fluctuation for the frequency response to reduce the fluctuation of the eye-diagram, the bias voltage to be applied to the resistance R2 has to be stabilized. The emitter common amplifier of the preamplifier PRE is susceptible to the influences of the current fluctuation of the transistor T1, and determines the frequency response characteristics of the preamplifier. Therefore, the bias voltage must be free from the influences of the fluctuation of $V_{CC}$ so that it may be stabilized. The bias voltage, as shown in FIG. 21, is independent of the fluctuation of $V_{CC}$ because it is determined by the earth voltage and the circuit components.

On the other hand, the present limiting amplifier AWL must be able to respond to a wider frequency range than that of the preamplifier PRE, so that it is connected with the peaking network composed of resistances R3 and R4 and a capacitor CP. A load circuit composed of transistors T6 and T7 and resistances R5 and R6 exhibits a low input impedance by feedback through the resistances R5 and R6, so that the Miller effect of the transistor pair T4 and T5 (the differential input circuit) can be suppressed, and a wide frequency bandwidth of the present limiting amplifier AWL is realized.

For high driving capability and flatness of frequency response, the output buffer of the present limiting amplifier AWL is equipped with a two-stage emitter follower (transistors T8, T10 or T9, T11) and damping resistors R10 and R11. The output signal of the preamplifier is branched by the transistor T12 and input to the reference voltage generator VRG. This reference voltage generator is constructed of a low-pass filter composed of a resistor R14 and capacitors CLP and CEXT, and an emitter follower transistor T13. Its output voltage Vref indicates the intermediate value of the output voltage VPRE of the preamplifier PRE.

Each of the foregoing embodiments employs bipolar transistors, but the optical receiver can be realized in each case with field effect transistors (such as metal-oxide-semiconductor field effect transistors or metal-semiconductor field effect transistors) in place of the bipolar transistors, with appropriate modifications well understood by the person of ordinary skill.

Figure 23:
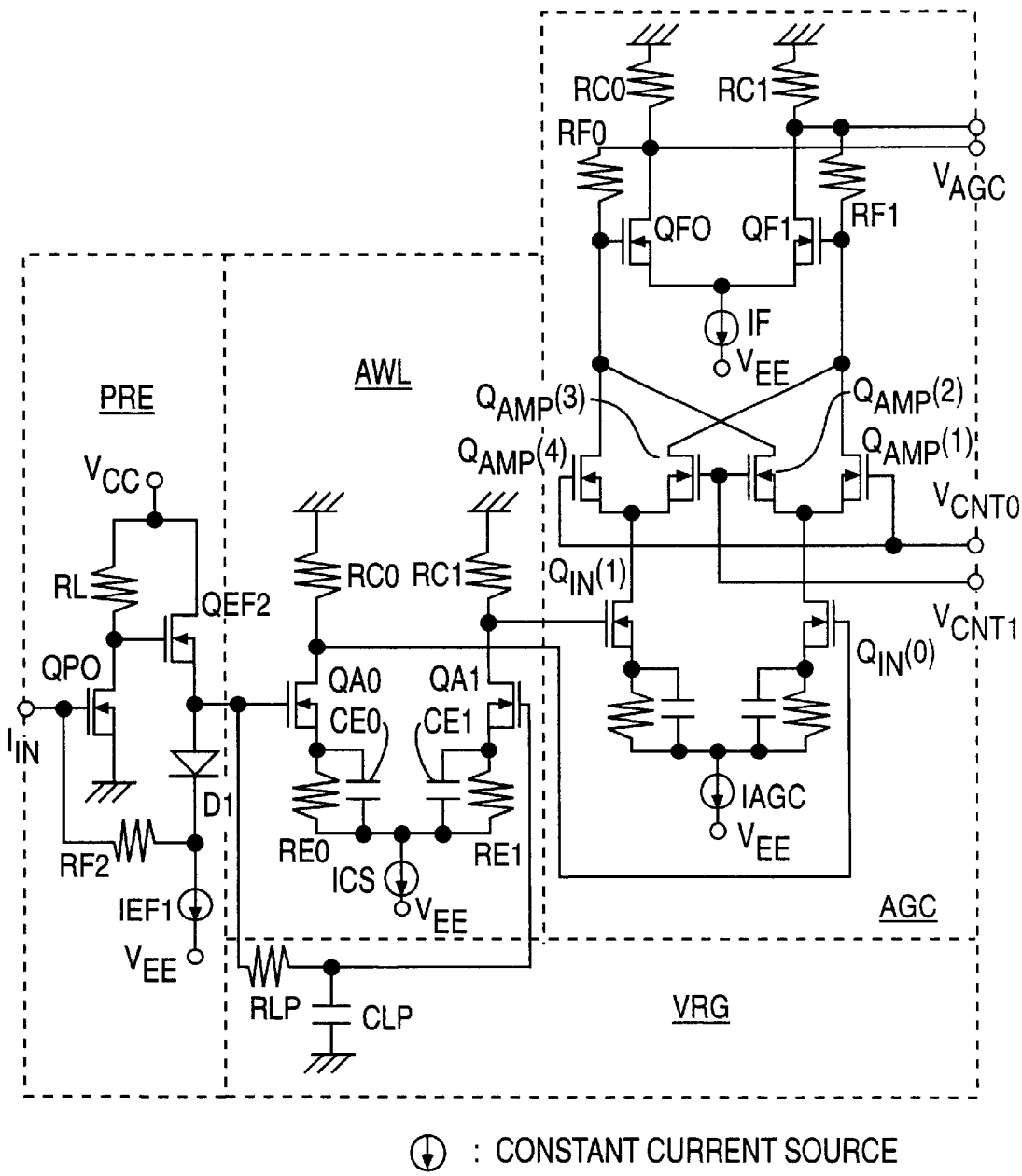
FIG. 23 illustrates another embodiment detailing the circuit shown in FIG. 9.

FIG. 23 shows the optical receiver circuit of FIG. 12, substituting MOS (Metal-Oxide-Semiconductor)-type field effect transistors for all of the bipolar transistors thereof.

In the optical receiver of FIG. 12, the transistors QP0, QEF in the preamplification stage, the transistors QA0, QA1 in the present limiting amplification stage, and the transistors $Q_{IN}(0)$, $Q_{IN}(1)$, $Q_{AMP}(1)$, $Q_{AMP}(2)$, $Q_{AMP}(3)$, $Q_{AMP}(4)$, QF0, and QF1 in the AGC amplification stage have NPN-type bipolar transistor structures having collector and emitter regions of N-conduction type and base regions of P-conduction type. In contrast to the optical receiver of FIG. 12, each transistor in FIG. 23 has a MOS-type transistor structure having an N-channel (i.e., an N-channel MOSFET).

An N-channel MOSFET comprises source and drain regions of N-conduction type separated from each other by a semiconductor region of P-conduction type. On the main surface of the semiconductor region of P-type disposed between the source and drain regions, the oxide film (the insulating film) is formed, and furthermore, a gate electrode is formed on the oxide film so as to apply an electric field to the semiconductor region of P-type via the oxide film.

To optimize the signal processing rate for an optical communication system for a trunk line, bipolar transistors are preferable. However, for integrating the optical receiver circuit of the present invention on the same semiconductor substrate, MOSFETs are preferable, because the isolation between the transistors formed monolithically can be fabricated easier than the bipolar transistors.

Each N-channel MOSFET in FIG. 23 sets the potential of its semiconductor region of P-type between its source and drain regions equal to the lower side of the circuitry (the source potential), but the potential condition of the semiconductor region of P-type can be modified and is not limited to the manner of this embodiment.

Figure 24:
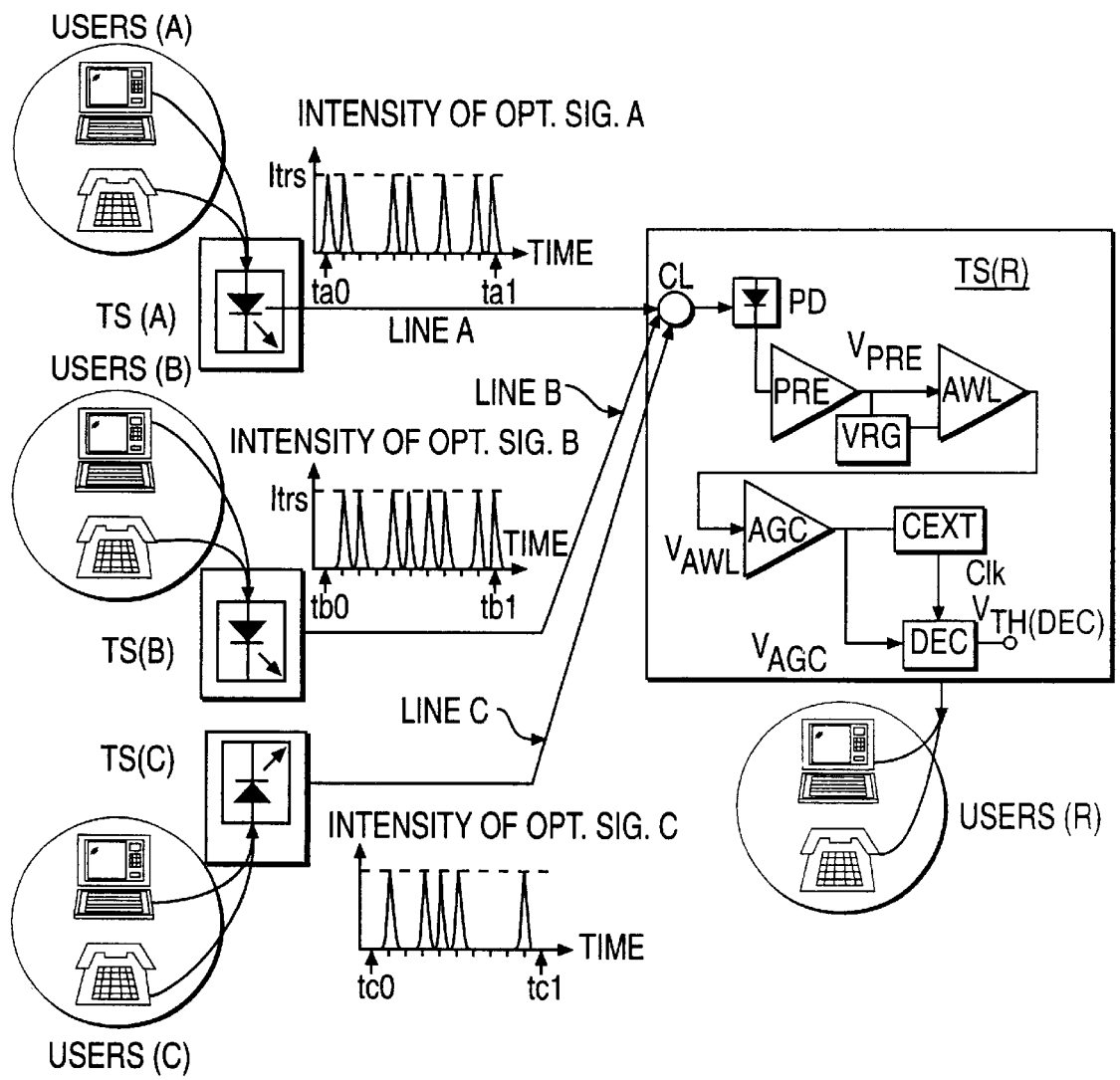
FIG. 24 illustrates an optical communication system employing the optical receiver of the present invention.

FIG. 24 shows an optical communication system employing the present optical receiver.

To emphasize the concept of the present optical communication system, the functions of the telephone stations (central offices) designated as TS(A), TS(B), and TS(C) are limited to transmitting the optical signal toward the telephone station TS(R) via optical fiber cables designated as LINE A, LINE B, and LINE C in FIG. 24. In contrast to the telephone stations TS(A), TS(B), TS(C), the functions of the telephone station TS(R) are limited to receiving the optical signals from the telephone stations TS(A), TS(B), TS(C). In practice, the optical signals are transmitted bi-directionally between the telephone stations. In FIG. 24, the symbols of a telephone set and a computer within the circle designated USERS(A), USERS(B), USERS(C), and USERS(R) show the terminals of the subscribers of TS(A), TS(B), TS(C), and TS(R), respectively.

For the illustrated example, the process for transmitting the information from USERS(A), USERS(B), USERS(C) to the USERS(R) using the present optical communication system is explained below. The information from each subscriber of USERS(A), USERS(B), USERS(C) is transformed to an optical signal having its wavelength in the range of 1.3–1.6 μm in each telephone station, and input into one of the optical fiber cables of LINE A, LINE B, and LINE C bound for the telephone station TS(R). Each spectrum of the intensity of the optical signal transmitted from each telephone station of TS(A), TS(B), TS(C) versus time is shown in FIG. 24. Each information transmitted from the telephone stations of TS(A), TS(B), TS(C) is encoded as digital information consisting of "1"-signals ltrs and "0"-signals where there is no optical pulse.

All of the optical signals transmitted from the telephone station TS(A) during the time $T_{a0}$ and $T_{a1}$, from the telephone station TS(B) during the time $T_{b0}$ and $T_{b1}$, and from the telephone station TS(C) during the time $T_{c0}$ and $T_{c1}$ enter the optical fiber optically connected to the photodiode PD in the telephone station TS(R) via the optical coupler CL (for example, a star coupler disposed in the telephone station TS(R)) or on the trunk line bound therefor. Then, the optical signals received from the telephone stations TS(A), TS(B), TS(C) are processed serially along the time schedule provided for each of these telephone stations, and are decoded to the original information as sent by the subscriber thereof. The decoding apparatus is disposed in the telephone station TS(R) or the terminal of the subscriber thereof, as required by the manner of transmission.

In FIG. 24, the distance AR between the telephone stations TS(A) and TS(R) is set as 20 km, the distance BR between the telephone stations TS(B) and TS(R) is set as 100 km, and the distance CR between the telephone stations TS(C) and TS(R) is set as 500 km, respectively. The optical signals received by the photodiode PD in the telephone station (R) are converted to the voltage signals shown in FIG. 25(a) by the preamplifier PRE. The vertical axis of FIG. 25(a) denotes the voltage of the signal VPRE output by the preamplifier PRE. When the voltage swing of VPRE exceeds VDET, the waveform of the signal deteriorates in the AGC amplifier disposed downstream of the preamplifier PRE, and the error rate for discriminating the signals exceeds the level allowed for practical use. Since the optical signal transmitted from the telephone station TS(A) near the station TS(R) during the time $T_{a0}$ and $T_{a1}$ is not affected by the optical loss during its propagation through the optical fiber cable LINE A, therefore, it tends to be converted to a strong voltage pulse having its voltage swing $V_a$ exceeding VDET by the preamplifier.

In the present optical communication system, the amplifier with limiting function is disposed between the preamplifier PRE and the AGC amplifier AGC, and is designed to limit its output voltage VAWL to the voltage swing of the first voltage $V_1$ (set at a value less then VDET) when the voltage swing of VPRE becomes equal to or larger than $V_1$. Consequently, the digitized information from the telephone station TS(A) can be converted to VAGC without any deterioration of its waveform, and transmitted to the decision circuit DEC.

The threshold voltage $V_{TH}$(DEC) of the decision circuit is predetermined to the voltage between the voltage $V_1$ and the voltage of zero-level artificially (by the operator, etc.) in the telephone station TS(R). An example voltage of $V_{TH}$(DEC) is half of $V_1$. The AGC amplifier controls its gain with respect to the voltage swing of the signal input thereto, and gives the signal a sufficient voltage swing exceeding $V_{TH}$ (DEC) for the signal discrimination in the decision circuit. In practical use, the AGC amplifier tunes its gain with respect to the voltage swing of a dummy optical signal transmitted from each of the stations TS(A), TS(B), and TS(C) before transmission of the optical signal of the information to be sent. But such a function of the AGC amplifier is not complete because the AGC amplifier cannot give a sufficient voltage swing to an input signal having a voltage swing below the second voltage $V_2$.

Figure 25A:
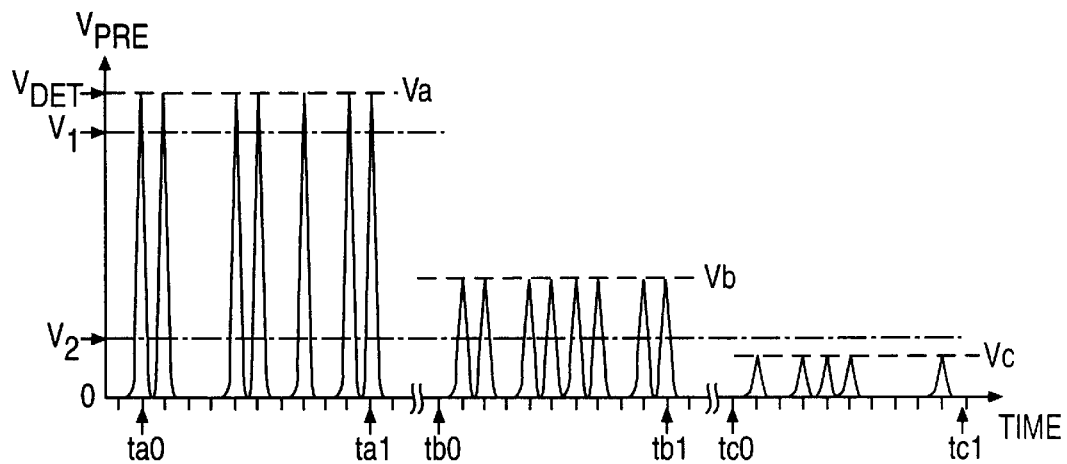
FIGS. 25(a)–(c) illustrate waveforms of a voltage signal transmitted through the circuit of the optical receiver shown in FIG. 24.

Since the optical signal transmitted from a telephone station TS(C) situated as far as 500 km from the station TS(R) during the time $T_{c0}$ and $T_{c1}$ is fairly affected by optical loss during its propagation through the optical fiber cable LINE C, therefore, the voltage swing of the signal VPRE to which the optical signal is converted by the preamplifier cannot reach $V_2$ as shown in FIG. 25(a). To discrimination such a weak signal VPRE transmitted from the station TS(A), the decision circuit DEC must be designed to vary its threshold voltage of $V_{TH}$(DEC) with respect to the voltage swing of the signal VPRE. However, this method cannot be applied to discriminate a signal consisting of pulses transmitted at such short intervals as 1 ns or less.

Figure 25B:
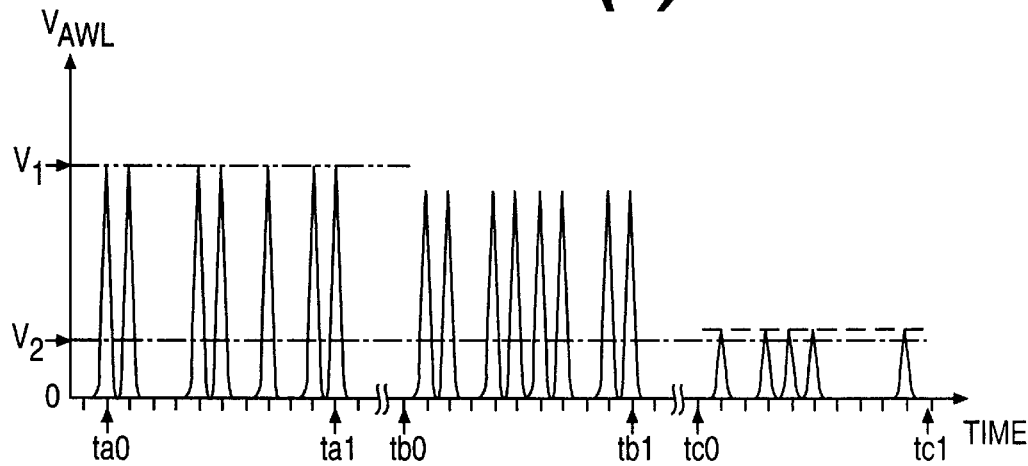
Figure 25C:
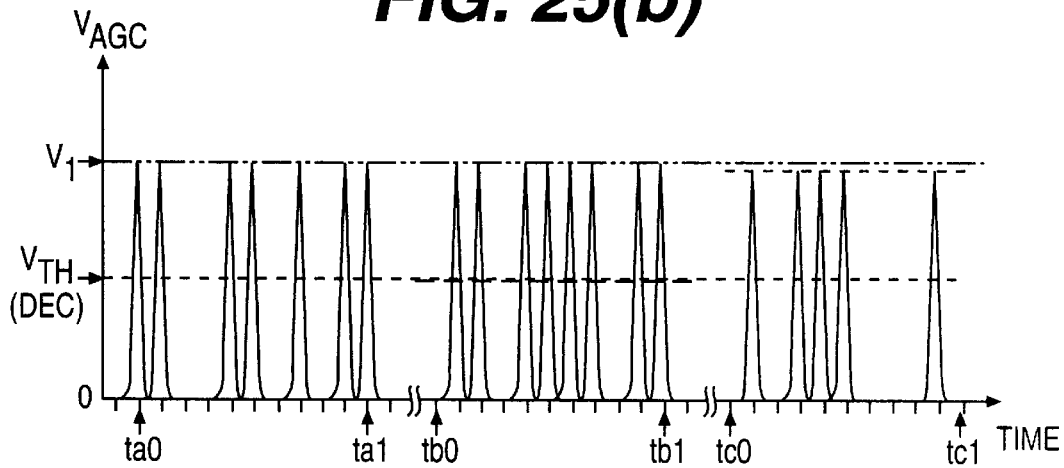

In the present optical communication system, the amplifier with limiting function mentioned above linearly amplifies the signal VPRE having a voltage swing of $V_C$, and converts it to the signal VAWL having a larger voltage swing than $V_2$ as shown in FIG. 25(b). Although the voltage swing of the signal amplified by the amplifier with limiting function does not reach the threshold voltage of $V_{TH}$(DEC), it can be discriminated in the decision circuit by an additional linear amplification by an AGC amplifier and conversion to the signal of VAGC as shown in FIG. 25(c).

As mentioned above, the present optical communication system inserts a linear amplifier between the preamplifier and the AGC amplifier, which assists the AGC amplifier and limits its linear amplification with respect to a voltage swing of the signal input thereto. Thus, in the present optical communication system, the signal transmitted from the preamplifier to the AGC amplifier can be processed, whether it is to be limited to the predetermined voltage or amplified linearly according to its swing voltage during its steady transmission. Processing the signal under its steady transmission form the preamplifier to the AGC amplifier enables the optical receiver to widen its dynamic range of optical signal intensity, to be received without any limitation of its transmission rate that might be caused by the prior art as tuning the gain of the preamplifier or the threshold voltage of the decision circuit.

Various modifications of the present invention will become apparent to those of ordinary skill in the art. All such modifications that basically rely upon the teachings through which the invention has advanced the state of the art are probably considered within the spirit and scope of the invention.

We claim:

1. A telephone station for an optical communication system, comprising:
   an optical coupler being optically connectable to another telephone station to receive an optical signal transmitted from the other telephone station and output an optical signal output; and
   an optical receiver for converting an optical signal received into an electrical signal to output the electric signal, said optical receiver being optically connected to said optical coupler to receive the optical signal output of said optical coupler, said optical receiver comprising:
      a photoelectric converter connected to receive the optical signal output by the optical coupler, and having an electric current signal output;
      a preamplifier connected to receive the current signal output by the photoelectric converter, and having a voltage signal output;
      an amplifier having a limiting function and connected to receive the voltage signal output by the preamplifier, to linearly amplify the voltage signal when the voltage signal is different from a reference voltage by less than or equal to a predetermined voltage, and to limitedly amplify said voltage signal when the voltage signal is different from the reference voltage by more than the predetermined voltage; and
      an automatic-gain-control amplifier connected to receive and amplify the output voltage signal of said amplifier having the limiting function, to output a signal having a constant swing,
      wherein the output signal swing of said amplifier having the limiting function satisfies the following relation within a desired dynamic range of said optical signal:

$$\Delta VAWL < Rs \cdot \Delta t,$$

wherein $\Delta VAWL$ is the output signal swing of said amplifier having the limiting function; $\Delta t$ is the time period to be occupied by a single optical bit; and Rs is the slew rate of said amplifier having the limiting function.

2. A telephone station according to claim 1, wherein said photoelectric converter is an avalanche photodiode.

3. A telephone station according to claim 1, wherein said photoelectric converter includes an optical fiber amplifier and a PIN photodiode.

4. A telephone station according to claim 1, wherein the predetermined voltage is set larger than the difference between the voltage signal output by said preamplifier and said reference voltage at the minimum receiver sensitivity.

5. A telephone station according to claim 4, wherein said photoelectric converter is an avalanche photodiode.

6. A telephone station according to claim 4, wherein said photoelectric converter includes an optical fiber amplifier and a PIN photodiode.

7. An optical communication system, comprising:

an optical fiber;

a first telephone station for transmitting an optical signal, said first telephone station being connected to said optical fiber; and a second telephone station for receiving an optical signal from said first telephone station, said second telephone station being connected to said optical fiber and comprising:

an optical coupler being optically connectable to said first telephone station to receive an optical signal transmitted from said first telephone station and output an optical signal output; and an optical receiver for converting an optical signal received into an electrical signal to output the electric signal, said optical receiver being optically connected to said optical coupler to receive the optical signal output of said optical coupler, said optical receiver comprising:

a photoelectric converter connected to receive the optical signal output by the optical coupler, and having an electric current signal output;

a preamplifier connected to receive the current signal output by the photoelectric converter, and having a voltage signal output;

an amplifier having a limiting function and connected to receive the voltage signal output by the preamplifier, to linearly amplify the voltage signal when the voltage signal is different from a reference voltage by less than or equal to a predetermined voltage, and to limitedly amplify said voltage signal when the voltage signal is different from the reference voltage by more than the predetermined voltage; and an automatic-gain-control amplifier connected to receive and amplify the output voltage signal of said amplifier having the limiting function, to output a signal having a constant swing, wherein the output signal swing of said amplifier having the limiting function satisfies the following relation within a desired dynamic range of said optical signal:

$$\Delta VAWL < Rs \cdot \Delta t,$$

wherein $\Delta$VAWL is the output signal swing of said amplifier having the limiting function; $\Delta t$ is the time period to be occupied by a single optical bit; and Rs is the slew rate of said amplifier having the limiting function.

8. An optical communication system according to claim 7, wherein said photoelectric converter is an avalanche photodiode.

9. An optical communication system according to claim 7, wherein said photoelectric converter includes an optical fiber amplifier and a PIN photodiode.

10. An optical communication system according to claim 7, wherein the predetermined voltage is set larger than the difference between the voltage signal output by said preamplifier and said reference voltage at the minimum receiver sensitivity.

11. An optical communication system according to claim 10, wherein said photoelectric converter is an avalanche photodiode.

12. An optical communication system according to claim 10, wherein said photoelectric converter includes an optical fiber amplifier and a PIN photodiode.

* * * * *